(12) United States Patent
Abramov et al.

(10) Patent No.: US 11,512,016 B2
(45) Date of Patent: Nov. 29, 2022

(54) METHODS OF SEPARATING A GLASS WEB

(71) Applicant: CORNING INCORPORATED, Corning, NY (US)

(72) Inventors: Anatoli Anatolyevich Abramov, Painted Post, NY (US); Craig Gene Stewart, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 628 days.

(21) Appl. No.: 16/494,455

(22) PCT Filed: Mar. 15, 2018

(86) PCT No.: PCT/US2018/022606
§ 371 (c)(1),
(2) Date: Sep. 16, 2019

(87) PCT Pub. No.: WO2018/175193
PCT Pub. Date: Sep. 27, 2018

(65) Prior Publication Data
US 2020/0087193 A1     Mar. 19, 2020

Related U.S. Application Data

(60) Provisional application No. 62/474,856, filed on Mar. 22, 2017.

(51) Int. Cl.
*C03B 33/09*     (2006.01)
*B23K 26/53*     (2014.01)
(Continued)

(52) U.S. Cl.
CPC ........ *C03B 33/091* (2013.01); *B23K 26/0608* (2013.01); *B23K 26/0626* (2013.01);
(Continued)

(58) Field of Classification Search
CPC .............. B23K 26/0622; B23K 26/082; B23K 26/006; B23K 26/0665
See application file for complete search history.

(56) References Cited

U.S. PATENT DOCUMENTS 5,132,505 A   7/1992   Zonneveld et al.
5,254,833 A   10/1993  Okiyama
(Continued)

FOREIGN PATENT DOCUMENTS

CN   103097313 A   5/2013
CN   105189022 A   12/2015
(Continued)

OTHER PUBLICATIONS

Japanese Patent Application No. 2019-552120, Office Action dated Nov. 8, 2021, 12 pages (6 pages of English Translation and 6 pages of Original Document), Japanese Patent Office.
(Continued)

*Primary Examiner* — Thien S Tran
(74) *Attorney, Agent, or Firm* — Kevin M. Able

(57) ABSTRACT

Methods of separating a glass web include exposing a separation path on the glass web to a laser beam that produces thermal stress along the separation path without damaging the glass web. The methods further include redirecting a portion of the laser beam to create a defect on the separation path while the separation path is under thermal stress produced during the exposing the separation path on the glass web to the laser beam, whereupon the glass web separates along the separation path in response to creating the defect. Apparatus are further provided for separating a glass web with at least one laser beam generator that produces a laser beam to heat a separation path and a mirror (Continued)

configured to reflect an end portion of the laser beam to create a defect at a location of the separation path on the glass web.

18 Claims, 14 Drawing Sheets

(51) Int. Cl.
  *B23K 26/06* (2014.01)
  *B23K 26/08* (2014.01)
  *C03B 33/02* (2006.01)
(52) U.S. Cl.
  CPC ...... *B23K 26/0643* (2013.01); *B23K 26/0665* (2013.01); *B23K 26/0846* (2013.01); *B23K 26/53* (2015.10); *C03B 33/0207* (2013.01)

(56) References Cited

U.S. PATENT DOCUMENTS

| | | | |
|---|---|---|---|
| 5,984,159 A | 11/1999 | Ostendarp et al. | |
| 6,327,875 B1 | 12/2001 | Allaire et al. | |
| 6,800,831 B1 | 10/2004 | Hoetzel | |
| 6,992,026 B2 | 1/2006 | Fukuyo et al. | |
| 7,164,519 B2 | 1/2007 | Han et al. | |
| 7,260,401 B2 | 8/2007 | Chen et al. | |
| 7,396,742 B2 | 7/2008 | Fukuyo et al. | |
| 7,547,613 B2 | 6/2009 | Fukuyo et al. | |
| 7,592,238 B2 | 9/2009 | Fukuyo et al. | |
| 7,605,344 B2 | 10/2009 | Fukumitsu | |
| 7,608,214 B2 | 10/2009 | Kuno et al. | |
| 7,615,721 B2 | 11/2009 | Fukuyo et al. | |
| 8,051,679 B2 | 11/2011 | Abramov et al. | |
| 8,347,651 B2 | 1/2013 | Abramov et al. | |
| 8,677,783 B2 | 3/2014 | Abramov et al. | |
| 8,932,510 B2 | 1/2015 | Li et al. | |
| 9,212,081 B2 | 12/2015 | Peng et al. | |
| 10,017,411 B2 | 7/2018 | Abramov et al. | |
| 2003/0024909 A1 | 2/2003 | Hoekstra et al. | |
| 2005/0221044 A1 | 10/2005 | Gaume et al. | |
| 2006/0266195 A1 | 11/2006 | Hoetzel et al. | |
| 2007/0151962 A1 | 7/2007 | Doll et al. | |
| 2008/0264994 A1 | 10/2008 | Herve et al. | |
| 2008/0286548 A1 | 11/2008 | Ellison et al. | |
| 2009/0046240 A1 | 2/2009 | Bolton | |
| 2009/0126403 A1* | 5/2009 | Abramov | C03B 33/091 65/29.18 |
| 2009/0320524 A1 | 12/2009 | Abramov et al. | |
| 2010/0206008 A1 | 8/2010 | Harvey et al. | |
| 2010/0294748 A1* | 11/2010 | Garner | C03B 33/04 219/121.72 |
| 2011/0049765 A1 | 3/2011 | Li et al. | |
| 2011/0127242 A1 | 6/2011 | Li | |
| 2011/0127244 A1 | 6/2011 | Li | |
| 2012/0047956 A1 | 3/2012 | Li | |
| 2012/0135853 A1 | 5/2012 | Amin et al. | |
| 2012/0145331 A1 | 6/2012 | Gomez et al. | |
| 2013/0133367 A1 | 5/2013 | Abramov et al. | |
| 2016/0136846 A1* | 5/2016 | Abramov | C03B 33/091 264/482 |
| 2018/0312422 A1* | 11/2018 | Abramov | C03B 17/02 |
| 2018/0346369 A1 | 12/2018 | Abramov | |

FOREIGN PATENT DOCUMENTS

| | | | | |
|---|---|---|---|---|
| CN | 107182210 A | * | 9/2017 | ............ B32B 17/06 |
| EP | 1341730 B1 | | 8/2005 | |
| EP | 1990168 A1 | * | 11/2008 | ........... B23K 26/082 |
| JP | 2012-018207 A | | 1/2012 | |
| JP | 2012-506837 | | 3/2012 | |
| KR | 20070045732 A | * | 10/2005 | ............... G02F 1/13 |
| KR | 10-2007-0045732 A | | 5/2007 | |
| KR | 10-0918124 B1 | | 9/2009 | |
| KR | 10-0918214 B1 | | 9/2009 | |
| TW | 201536462 A | | 10/2015 | |
| WO | 2009/084276 A1 | | 7/2009 | |
| WO | 2010007953 A1 | | 1/2010 | |
| WO | 2013108568 A1 | | 7/2013 | |
| WO | 2014209833 A1 | | 12/2014 | |
| WO | 2016081330 A1 | | 5/2016 | |

OTHER PUBLICATIONS

Taiwanese Patent Application No. 107109606, Office Action dated Sep. 9, 2021, 1 page (English Translation Only); Taiwanese Patent Office.
International Search Report and Written Opinion of the International Searching Authority; PCT/US2018/022606; dated Oct. 16, 2018; 16 Pages; Korean Intellectual Property Office.
Chinese Patent Application No. 201880033763.2, Office Action dated Aug. 25, 2021, 11 pages (5 pages of English Translation and 6 pages of Original Document), Chinese Patent Office.

\* cited by examiner

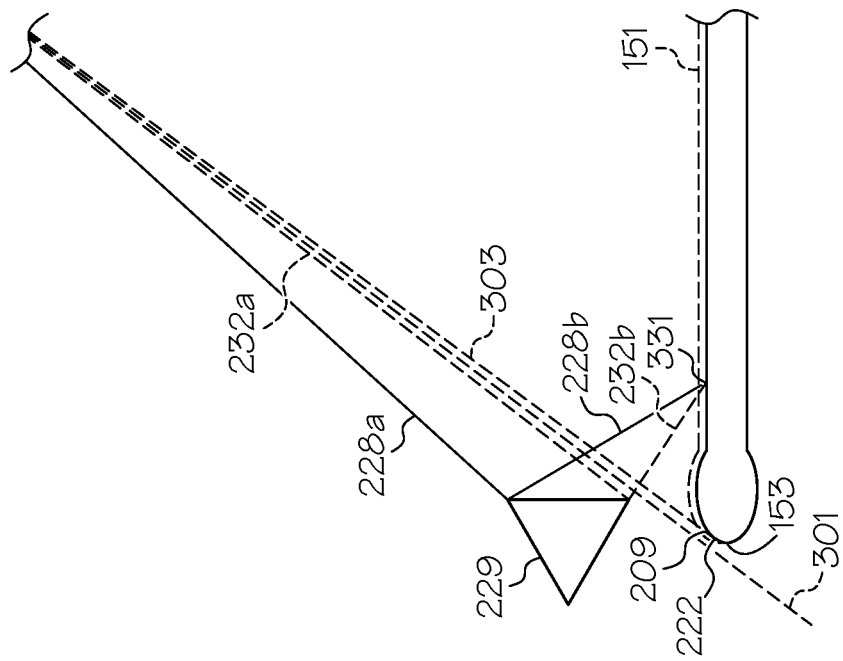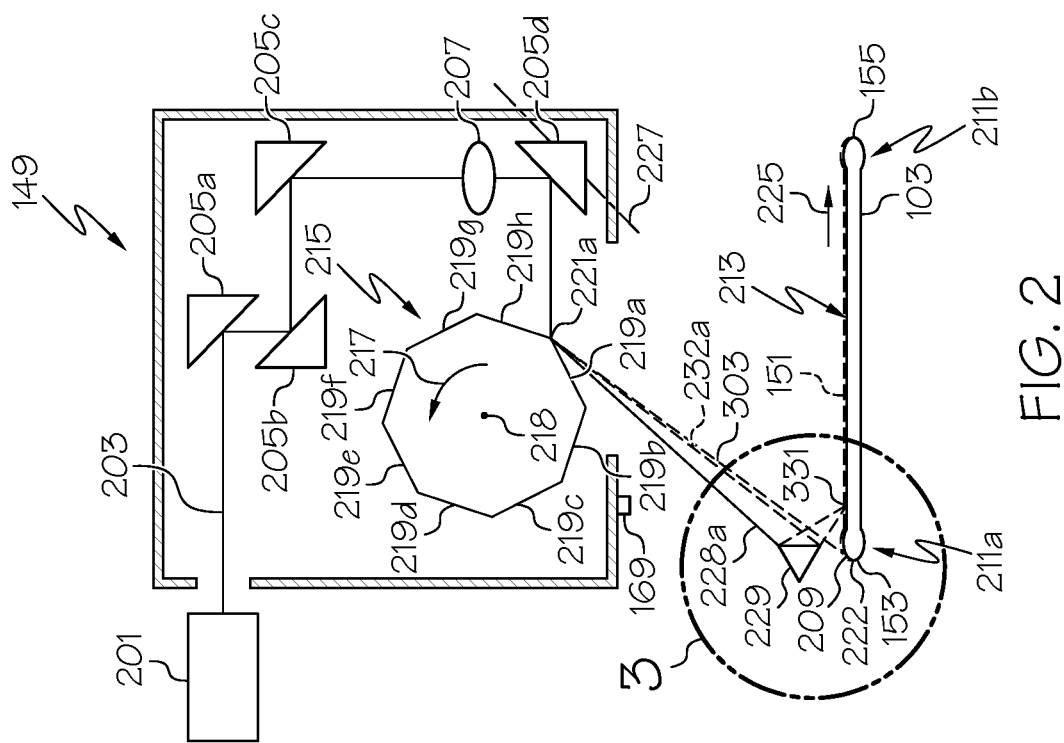

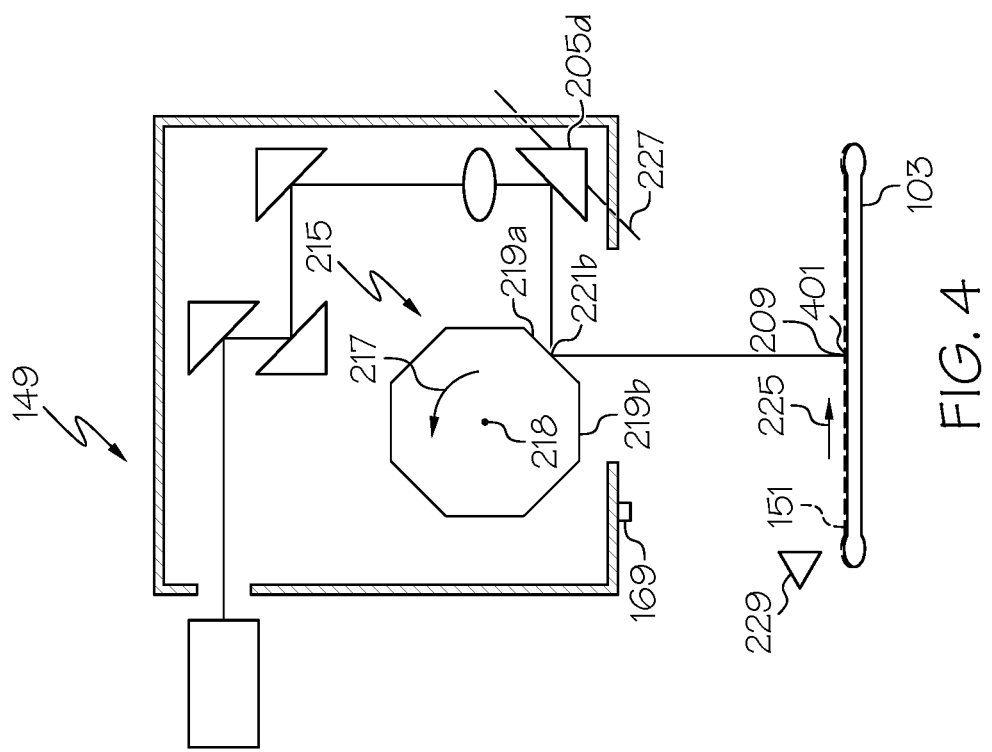

METHODS OF SEPARATING A GLASS WEB

CROSS-REFERENCE TO RELATED APPLICATIONS

This application claims the benefit of priority under 35 U.S.C. § 371 of International Application No. PCT/US18/22606, filed on Mar. 15, 2018 which claims the benefit of priority of U.S. Provisional Application Ser. No. 62/474,856 filed on Mar. 22, 2017 the contents of which are relied upon and incorporated herein by reference in their entirety as if fully set forth below.

FIELD

The present disclosure relates generally to methods of separating a glass web and, more particularly, to methods of separating a glass web by creating a defect on a separation path under thermal stress, whereupon the glass web separates along the separation path in response to creating the defect.

BACKGROUND

It is known to separate a glass ribbon to achieve a glass sheet with the desired dimensions. Conventional separation techniques achieve separation while the glass ribbon is stationary. Further conventional separation techniques achieve separation while the glass ribbon is moving, thereby avoiding uninterrupted traversing of the glass ribbon along a travel direction while separating the glass sheet from the glass ribbon.

SUMMARY

The following presents a simplified summary of the disclosure to provide a basic understanding of some embodiments described in the detailed description. Some example embodiments of the disclosure are described below with the understanding that any of the embodiments may be used alone or in combination with one another.

Embodiment 1

A method of separating a glass web may comprise exposing a separation path on the glass web to at least one laser beam to produce thermal stress along the separation path without damaging the glass web. The method may include redirecting a portion of the at least one laser beam to create a defect on the separation path while the separation path is under thermal stress produced during the exposing the separation path on the glass web to the at least one laser beam, whereupon the glass web separates along the separation path in response to creating the defect.

Embodiment 2

The method of embodiment 1 where the portion of the at least one laser beam is reflected from a reflecting surface during the redirecting to redirect the portion of the laser path to create the defect.

Embodiment 3

The method of any one of embodiments 1 and 2 where the portion of the at least one laser beam is focused to create the defect.

Embodiment 4

The method of any one of embodiments 1-3 where the defect is created while exposing the separation path on the glass web to the at least one laser beam.

Embodiment 5

The method of any one of embodiments 1-4 where the defect is created after a predetermined level of thermal stress is achieved along the separation path during the exposing the separation path on the glass web to the at least one laser beam.

Embodiment 6

The method of any one of embodiments 1-5 where the glass web includes a first edge and a second edge opposed to the first edge, and where the separation path extends from the first edge to the second edge.

Embodiment 7

The method of embodiment 6 where the defect is created between the first edge and the second edge.

Embodiment 8

The method of embodiment 6 where the defect is created a distance from one of the first edge and the second edge of the glass web, where the distance is from 0 mm to about 25 mm.

Embodiment 9

The method of any one of embodiments 6-8 where the at least one laser beam traverses a beam path that extends off at least one of the first edge and the second edge of the glass web during the exposing the separation path on the glass web to the at least one laser beam.

Embodiment 10

The method of any one of embodiments 6-9 where the exposing the separation path on the glass web to the at least one laser beam comprises intersecting the at least one laser beam at a corresponding beam spot on a major surface of the glass web, and repeatedly passing the beam spot along the separation path to produce the thermal stress along the separation path.

Embodiment 11

The method of embodiment 10 where repeatedly passing the beam spot includes repeatedly passing the beam spot in a single direction.

Embodiment 12

The method of embodiment 11 where the single direction comprises a direction extending from the first edge toward the second edge of the glass web, and where the defect is created closer to the first edge than the second edge.

Embodiment 13

The method of any one of embodiments 1-12 where the at least one laser beam applies a varying power density along the separation path to produce the thermal stress.

Embodiment 14

The method of any one of embodiments 1-13 where a plurality of laser beams produce the thermal stress along the separation path with each laser beam producing thermal stress along a corresponding segment of the separation path.

Embodiment 15

The method of embodiment 14 where each segment of the separation path overlaps at least one adjacent segment of the separation path.

Embodiment 16

The method of any one of embodiments 1-5 where the glass web comprises a glass sheet, the separation path extends along a length of the glass sheet, and where the separation along the separation path separates an edge portion of the glass sheet from a central portion of the glass sheet.

Embodiment 17

The method of any one of embodiments 1-15 where the glass web comprises a glass ribbon, the separation path extends along a width of the glass ribbon, and where the separation along the separation path separates a glass sheet from the glass ribbon.

Embodiment 18

The method of any one of embodiments 1-17 where the glass web comprises a plurality of layers and a coefficient of thermal expansion of one layer of the plurality of layers is different than a coefficient of thermal expansion of another layer of the plurality of layers.

Embodiment 19

The method of any one of embodiments 1-18 where the glass web is positioned such that the entire separation path is located within a depth of focus of the laser beam.

Embodiment 20

The method of embodiment 19 where the depth of focus of the laser beam is from about 20 mm to about 400 mm.

Embodiment 21

A method of separating a glass web can include moving the glass web at a glass web velocity comprising a glass web velocity vector in a conveyance direction of the moving glass web. The method can further include exposing a separation path on the glass web to at least one laser beam spot generated by at least one laser beam to produce thermal stress along the separation path, the separation path extending in a direction transverse to the conveyance direction. The method can further include moving the laser beam spot at a laser beam spot velocity comprising a laser beam spot velocity vector in the conveyance direction that is equal to the glass web velocity vector, where the separation path continues to be exposed to the laser beam spot to continue producing thermal stress along the separation path while the glass web moves at the glass web velocity. The method can further include redirecting a portion of the at least one laser beam to create a defect on the separation path while the separation path is under thermal stress produced during the exposing the separation path and the moving the laser beam spot, whereupon the glass web separates along the separation path in response to creating the defect.

Embodiment 22

The method of embodiment 21 where the portion of the at least one laser beam is reflected from a reflecting surface during the redirecting to redirect the portion of the at least one laser beam to create the defect.

Embodiment 23

The method of any one of embodiments 21 and 22 where the portion of the at least one laser beam is focused to create the defect.

Embodiment 24

The method of any one of embodiments 21-23 where the moving the laser beam spot includes reflecting the at least one laser beam off a rotating reflective surface to cause the laser beam spot to move at the laser beam spot velocity vector.

Embodiment 25

The method of any one of embodiments 21-24, further comprising repeatedly passing the laser beam spot along the separation path in the direction transverse to the conveyance direction to produce the thermal stress along the separation path during the exposing the separation path and the moving the laser beam spot.

Embodiment 26

The method of embodiment 25 where the laser beam spot velocity comprises another laser beam spot velocity vector in the direction transverse to the conveyance direction, wherein the laser beam spot moves in the conveyance direction and the direction transverse to the conveyance direction such that the separation path continues to be exposed to the laser beam spot to continue producing thermal stress along the separation path while the glass web moves at the glass web velocity and while the laser beam spot continues to repeatedly pass along the separation path in the direction transverse to the conveyance direction.

Embodiment 27

The method of embodiment 26 where the moving the laser beam spot includes reflecting the at least one laser beam off a first reflective surface rotating about a first axis to cause the laser beam spot to repeatedly pass along the separation path in the direction transverse to the conveyance direction, and reflecting the at least one laser beam off a second reflective surface rotating about a second axis to cause the laser beam spot to move at the laser beam velocity vector in the conveyance direction of the glass web.

Embodiment 28

The method of embodiment 27 where the at least one laser beam reflects off the first reflective surface before the second reflective surface.

Embodiment 29

The method of embodiment 27 where the at least one laser beam reflects off the second reflective surface before the first reflective surface.

Embodiment 30

The method of any one of embodiments 27-29 where the first axis is perpendicular to the second axis.

Embodiment 31

The method of any one of embodiments 25-30 where the step of repeatedly passing the beam spot includes repeatedly passing the beam spot in a single direction transverse to the conveyance direction.

Embodiment 32

The method of embodiment 31 where the single direction comprises a direction extending from a first edge toward a second edge of the glass web, and wherein the defect is created closer to the first edge than the second edge.

Embodiment 33

The method of any one of embodiments 21-32 where the defect is created while the laser beam spot is moved at the laser beam spot velocity.

Embodiment 34

The method of any one of embodiments 21-33 where the defect is created after a predetermined level of thermal stress is achieved along the separation path during the moving the laser beam spot.

Embodiment 35

The method of any one of embodiments 21-34 where the at least one laser beam spot comprises a plurality of laser beam spots that each produce thermal stress along a corresponding segment of the separation path during the exposing the separation path.

Embodiment 36

The method of embodiment 35 where each segment of the separation path overlaps a portion of at least one adjacent segment of the separation path.

Embodiment 37

The method of any one of embodiments 21-36 where the glass web includes a length and a width, and the conveyance direction is a direction of the length of the glass web.

Embodiment 38

The method of any one of embodiments 21-36 where the glass web comprises a glass ribbon drawn from a forming body, and the conveyance direction is a draw direction of the glass ribbon.

Embodiment 39

An apparatus for separating a glass web can include at least one laser beam generator to produce a laser beam that traverses along a separation path, where the laser beam heats the entire separation path extending from a first edge of the glass web to an opposed second edge of the glass web. The apparatus can further include a mirror configured to reflect an end portion of the laser path to create a defect at a location of the separation path on the glass web.

Embodiment 40

The apparatus of embodiment 39, where the mirror comprises a parabolic mirror.

Embodiment 41

The apparatus of embodiment 39, further comprising a lens configured to focus the end portion of the laser path.

Embodiment 42

The apparatus of any one of embodiments 39-41, further comprising a first reflector including a first reflective surface rotatable about a first axis. In this embodiment, the laser beam generator can be aligned with the first reflector such that a laser beam produced by the at least one laser beam generator will produce a laser beam spot that repeatedly passes within a laser path along the separation path on the glass web when the first reflector is rotated.

Embodiment 43

An apparatus for separating a glass web includes at least one laser beam generator and a first reflector comprising a first reflective surface rotatable about a first axis. The laser beam generator is aligned with the first reflector such that a laser beam produced by the at least one laser beam generator will produce a laser beam spot that repeatedly passes along a separation path on the glass web when the first reflector is rotated. The apparatus further includes a second reflector comprising a second reflective surface rotatable about a second axis. The second reflector is aligned with the first reflector such that the laser beam spot will move in a conveyance direction of the glass web when the second reflector is rotated. The first reflector is positioned upstream from the second reflector such that the laser beam produced by the laser beam generator reflects off the first reflective surface of the first reflector prior to reflecting off the second reflective surface of the second reflector. The apparatus further comprises a mirror configured to reflect an end portion of the laser path to create a defect at a location of the separation path on the glass web.

Embodiment 44

The apparatus of embodiment 43 where the mirror comprises a parabolic mirror.

Embodiment 45

The apparatus of embodiment 43, further comprising a lens configured to focus the end portion of the laser path.

Embodiment 46

An apparatus for separating a glass web comprising at least one laser beam generator, a first reflector and a second reflector. The second reflector includes a second reflective surface rotatable about a second axis. The laser beam generator is aligned with the second reflector such that a laser beam produced by the at least one laser beam generator will produce a laser path with a laser beam spot that will move in a conveyance direction of the glass web when the second reflector is rotated. The first reflector includes a first reflective surface rotatable about a first axis. The first reflector is aligned with the second reflector such that the laser beam spot produced by the at least one laser beam will repeatedly pass along a separation path on the glass web when the first reflector is rotated. The second reflector is positioned upstream from the first reflector such that the laser beam produced by the laser beam generator will reflect off the second reflective surface of the second reflector prior to reflecting off the first reflective surface of the first reflector. The apparatus further includes a mirror configured to reflect an end portion of the laser path to create a defect at a location of the separation path on the glass web.

Embodiment 47

The apparatus of embodiment 46 where the mirror comprises a parabolic mirror.

Embodiment 48

The apparatus of embodiment 46, further comprising a lens configured to focus the end portion of the laser path.

BRIEF DESCRIPTION OF THE DRAWINGS

These and other features, aspects and advantages of the present disclosure are better understood when the following detailed description is read with reference to the accompanying drawings, in which:

FIG. 2 is a cross sectional schematic view of an exemplary glass separation apparatus along line 2-2 of FIG. 1, wherein a laser beam is exposing an upstream end of a separation path on the glass ribbon;

FIG. 3 is an enlarged view of a schematic mirror taken a view 3 of FIG. 2;

FIG. 4 illustrates the laser beam exposing an intermediate location of the separation path on the glass ribbon;

DETAILED DESCRIPTION

Figure 1:
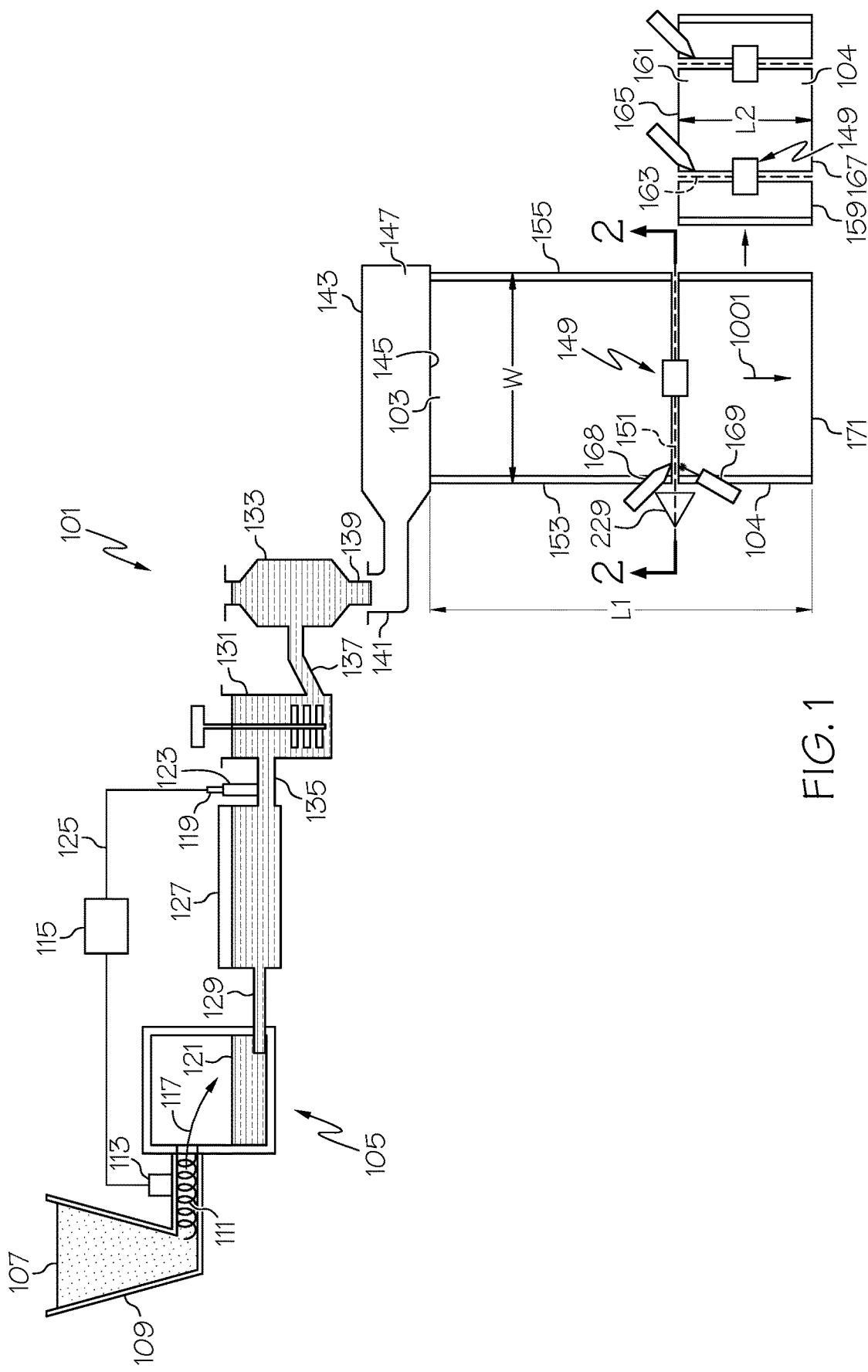
FIG. 1 is a schematic view of a fusion down-draw apparatus configured to draw a glass ribbon and exemplary glass ribbon separating apparatus.

Apparatus and methods will now be described more fully hereinafter with reference to the accompanying drawings in which exemplary embodiments of the disclosure are shown. Whenever possible, the same reference numerals are used throughout the drawings to refer to the same or like parts. However, this disclosure may be embodied in many different forms and should not be construed as limited to the embodiments set forth herein.

It is to be understood that specific embodiments disclosed herein are intended to be exemplary and therefore non-limiting. As such, the present disclosure relates to methods and apparatus for separating a glass web. In some embodiments, the glass web can include a glass ribbon formed from any glass forming process or glass manufacturing process. The glass ribbon can be provided directly from a glass forming apparatus or glass manufacturing apparatus, can be provided as a spool of glass ribbon that can be rolled or coiled onto a core, or can be provided as a freestanding glass ribbon. In other embodiments, the glass web can include a glass sheet formed by any glass forming process or glass manufacturing process. The glass sheet can be provided as a glass sheet separated from a glass ribbon, as a glass sheet separated from another glass sheet, as one or more glass sheets provided as a spool of one or more glass sheets rolled or coiled onto a core, as a stack of glass sheets, or as a freestanding glass sheet.

The glass web can be separated in accordance with the embodiments disclosed herein to form one or more additional glass webs. In some embodiments, the one or more additional glass webs separated from the glass web can include a glass ribbon. The glass ribbon can be separated from a glass ribbon provided directly from a glass forming apparatus or glass manufacturing apparatus, can be separated from a glass ribbon provided as a spool of glass ribbon that can be rolled or coiled onto a core, or can be separated from a glass ribbon provided as a freestanding glass ribbon. In other embodiments, the one or more additional glass webs separated from the glass web can include a glass sheet. The glass sheet can be separated from a glass ribbon provided directly from a glass forming apparatus or glass manufacturing apparatus, can be separated from a glass ribbon provided as a spool of glass ribbon that can be rolled or coiled onto a core, or can be separated from a glass ribbon provided as a freestanding glass ribbon. In still other embodiments, the glass sheet can be separated from a glass sheet provided as a glass sheet separated from a glass ribbon, can be separated from a glass sheet provided as a glass sheet separated from another glass sheet, can be separated from a glass sheet provided as a spool of one or more glass sheets rolled or coiled onto a core, can be separated from a glass sheet provided as a stack of glass sheets, or can be separated from a glass sheet provided as a freestanding glass sheet.

In further examples the glass web may be separated to remove an edge portion from a remainder of the glass web. For instance, the edge portion may be discarded or further processed in additional applications.

Glass sheets separated from the glass web can be suitable for further processing into a desired display application. The glass sheets can be used in a wide range of display applications, including liquid crystal displays (LCDs), electrophoretic displays (EPD), organic light emitting diode displays (OLEDs), plasma display panels (PDPs), or the like. Glass sheets may need to be transported from one location to another. The glass sheets may be transported with a conventional support frame designed to secure a stack of glass sheets in place. Moreover, interleaf material can be placed between each sheet of glass to help prevent contact and therefore preserve the pristine surfaces of the glass sheets.

Some embodiments will now be described wherein the glass web to be separated comprises a glass ribbon although apparatus and methods of the disclosure are not so limiting. Indeed, apparatus and methods of the disclosure can be used to separate any one of a variety of glass webs, such as the glass webs discussed above.

In some embodiments, methods of separating a glass web comprising a glass ribbon may be used in conjunction with a glass manufacturing apparatus configured to fabricate the glass ribbon although other glass processing apparatus may be provided in further embodiments. In some embodiments, the glass manufacturing apparatus can comprise a slot draw apparatus, float bath apparatus, down-draw apparatus, up-draw apparatus, press-rolling apparatus or other glass ribbon manufacturing apparatus. By way of example, FIG. 1 schematically illustrates an apparatus for processing a quantity of glass melt comprising a fusion down-draw apparatus 101 for fusion drawing a glass ribbon 103 for subsequent separation, for example, separation into another glass web such as the illustrated glass sheet 104. The fusion down-draw apparatus 101 can include a melting vessel 105 that receives batch material 107 from a storage bin 109. The batch material 107 can be introduced by a batch delivery device 111 powered by a motor 113. An optional controller 115 can be used to activate the motor 113 to introduce a desired amount of batch material 107 into the melting vessel 105, as indicated by arrow 117. A glass melt probe 119 can be used to measure a glass melt 121 level within a standpipe 123 and communicate the measured information to the controller 115 by way of a communication line 125.

The fusion down-draw apparatus 101 can also include a first conditioning station such as a fining vessel 127 located downstream from the melting vessel 105 and coupled to the melting vessel 105 by way of a first connecting conduit 129. In some embodiments, glass melt may be gravity fed from the melting vessel 105 to the fining vessel 127 by way of the first connecting conduit 129. For instance, gravity may drive the glass melt through an interior pathway of the first connecting conduit 129 from the melting vessel 105 to the fining vessel 127. Within the fining vessel 127, bubbles may be removed from the glass melt by various techniques.

The fusion draw apparatus can further include a second conditioning station such as a glass melt mixing vessel 131 that may be located downstream from the fining vessel 127. The glass melt mixing vessel 131 can be used to provide a homogenous glass melt composition, thereby reducing or eliminating cords of inhomogeneity that may otherwise exist within the fined glass melt exiting the fining vessel. As shown, the fining vessel 127 may be coupled to the glass melt mixing vessel 131 by way of a second connecting conduit 135. In some embodiments, glass melt may be gravity fed from the fining vessel 127 to the glass melt mixing vessel 131 by way of the second connecting conduit 135. For instance, gravity may drive the glass melt to pass through an interior pathway of the second connecting conduit 135 from the fining vessel 127 to the glass melt mixing vessel 131.

The fusion draw apparatus can further include another conditioning station such as a delivery vessel 133 that may be located downstream from the glass melt mixing vessel 131. The delivery vessel 133 may condition the glass to be fed into a forming device. For instance, the delivery vessel 133 can act as an accumulator and/or flow controller to adjust and provide a consistent flow of glass melt to the forming vessel. As shown, the glass melt mixing vessel 131 may be coupled to the delivery vessel 133 by way of a third connecting conduit 137. In some embodiments, glass melt may be gravity fed from the glass melt mixing vessel 131 to the delivery vessel 133 by way of the third connecting conduit 137. For instance, gravity may drive the glass melt through an interior pathway of the third connecting conduit 137 from the glass melt mixing vessel 131 to the delivery vessel 133.

As further illustrated, a downcomer 139 can be positioned to deliver glass melt 121 from the delivery vessel 133 to an inlet 141 of a forming vessel 143. The glass ribbon 103 may then be fusion drawn off the root 145 of a forming wedge 147 and subsequently separated into a glass web, such as another glass ribbon or the illustrated glass sheet 104, by a glass separation apparatus 149. FIG. 1 illustrates a general schematic of the glass separation apparatus 149 wherein FIGS. 2-5, 7 and 8 schematically illustrate exemplary features of the glass separation apparatus 149. Indeed, as illustrated, the glass separation apparatus 149 may divide the glass sheet 104 from the glass ribbon 103 along a separation path 151 that extends in a direction 225 (see FIG. 2) that is transverse to the conveyance direction such as the draw direction 1001. As illustrated in FIG. 1, in any of the embodiments of the disclosure, the direction 225 transverse to the conveyance direction 1001 may include the direction 225 being perpendicular to the conveyance direction 1001 or at another angle relative to the conveyance direction. In some embodiments, the direction 225 extends along a width "W" of the glass ribbon 103 between a first outer edge 153 and a second outer edge 155 of the glass ribbon 103. As illustrated in FIG. 1, in some embodiments, the conveyance direction 1001 of the glass ribbon 103 can include the draw direction of the glass ribbon. In the illustrated embodiment, the conveyance direction 1001 can be the fusion draw direction of the glass ribbon 103 being fusion down-drawn from the forming vessel 143. Alternatively, if the glass ribbon is being unwound from a spool of glass ribbon, the conveyance direction can be considered the direction along which the glass ribbon is being drawn from the spool. Still further, if the glass web (e.g., glass ribbon, glass sheet, etc.) is being traversed along a travel path, the conveyance direction can be considered the direction that the glass web travels along the travel path.

In one embodiment, shown in FIG. 1, a length of the glass ribbon 103 can be considered the overall length "L1" of the glass ribbon 103 extending from the root 145 of the forming wedge 147 to the outer end 171 (e.g., lower end) of the glass ribbon 103. In further embodiments, the length of the glass ribbon 103 may be considered a portion of the overall length "L1" of the glass ribbon. For example, the length of the glass ribbon 103 can be considered a dimension of the glass ribbon along a direction perpendicular to the width "W" of the glass ribbon 103. In addition or alternatively, the length of the glass ribbon 103 can be considered a dimension of the glass ribbon along the draw direction 1001 of the glass ribbon 103.

In another embodiment, the glass separation apparatus 149 may separate an edge portion (e.g., an edge web portion) from the glass web. For example, as shown in FIG. 1, the glass separation apparatus 149 can separate an edge portion 159 of the glass sheet 104 from a central portion 161 of the glass sheet 104 along a separation path 163 that extends transverse to a conveyance direction of the glass sheet 104, wherein the separation path 163 extends between a first edge 165 and a second edge 167 of the glass sheet 104. In the illustrated embodiment, the separation path 163 extends along a length "L2" of the glass sheet that is perpendicular to the conveyance path of the glass sheet 104.

FIG. 2 illustrates an exemplary glass separation apparatus 149 schematically illustrated in FIG. 1. The glass separation apparatus can include a laser beam generator 201 that produces a laser beam 203. In one embodiment, the laser beam generator produces a $CO_2$ laser beam that can heat the selected path with relatively long pulses that may approximate a continuous flow of energy can be utilized. As such, the laser beam 203 may be designed to heat the selected path on the glass ribbon (or glass sheet 104) without damaging the glass ribbon. For purposes of this application, heating the selected path on the glass ribbon without damaging the glass ribbon is intended to mean heating the path without damaging the glass ribbon in a manner that would otherwise result in separation of the glass ribbon without a defect. Examples of heating a selected path without damaging the glass ribbon can include heating without melting the glass ribbon, heating without ablating the glass ribbon, heating without creating a full-body crack in the glass ribbon, and heating without scoring the glass ribbon. Indeed, the laser beam 203 may avoid damaging the glass ribbon to allow generation of a desired level of thermal stress along the separation path 151, 163 of the glass ribbon (e.g., the glass ribbon 103 or the glass sheet 104) without separating the glass ribbon prior to application of the defect as discussed below.

As further shown in FIG. 2, the exemplary glass separation apparatus 149 may further include an optional series of reflectors 205a, 205b, 205c, 205d and one or more optical lenses 207 configured to provide a laser beam spot 209 on an outer edge portion 211a, 211b or a first major surface 213 of the glass ribbon 103 or glass sheet 104. Throughout the application, the laser beam can be moved along a path, and a laser beam spot 209 is considered the area of the surface of the glass web exposed to the laser beam 203 where the laser beam 203 intersects the surface of the glass web. In some embodiments, the laser beam spot may comprise a circular or rectangular laser beam spot or an oblong laser beam spot that has a maximum outer dimension that is significantly less than the overall length of the separation path 151. In such embodiments, as discussed below, the laser beam spot can be scanned repeatedly along the separation path prior to application of the defect. In further embodiments of the disclosure, the laser beam spot may comprise an elongated laser beam spot that spans the entire length of the separation path 151. For instance, the elongated laser beam spot may comprise a stationary laser beam spot that does not scan across, or otherwise move, relative to the glass ribbon 103. Rather, the elongated laser beam spot may simultaneously irradiate the entire separation path. In some embodiments, the laser beam, without redirecting, can extend even greater than the entire length of the separation path and/or can extend along a path off an edge of the glass web. Indeed, in some embodiments described below, a portion of the laser beam (e.g., that would otherwise project to extend off the edge of the glass web) may be redirected to create a defect on the separation path 151.

In some embodiments, where the laser beam spot is significantly less than the overall length of the separation path 151, the glass separation apparatus 149 can include a first reflector such as the illustrated polygonal reflector 215. The first reflector can include a first reflective surface. For instance, as shown in FIG. 2, the illustrated polygonal reflector 215 can include an octagonal reflector wherein the first reflective surface can comprise eight reflective surface segments 219a-h that may be integral with one another or provided as separate segments that are mounted in close proximity relative to one another. Furthermore, although an octagonal reflector may be used, other reflectors with more or less reflective surface segments may be used in accordance with aspects of the disclosure. The first reflective surface, or any reflective surface of the first reflector, or the reflective surface of any reflector of the disclosure, can comprise a surface of a mirror that reflects light from the reflective surface of the mirror, a reflective surface of polished metal or other reflective surface. In further embodiments, as shown, the reflective surfaces may be flat, although curved (e.g., concave, convex) surfaces may be provided in further embodiments.

In one embodiment, the method can include the step of exposing either one or both of the separation paths 151, 163 along the glass ribbon 103 or glass sheet 104 by rotating the first reflector in a clockwise or counterclockwise rotation. For instance, as shown in FIGS. 2-6 and 8-9, the polygonal reflector 215 may rotate in the counterclockwise direction 217 about a first rotation axis 218 to sequentially position each of the eight reflective surface segments 219a-h within the selected path of the laser beam 203. The illustrated rotation shown in the figures depicts the principles of sweeping the laser beam spot 209. Actual configuration and/or rotation of the polygonal reflector 215 will depend on a wide range of factors such as whether the laser beam spot 209 sweeps between extreme positions from the first outer edge 153 to the second outer edge 155 of the glass ribbon or whether the laser beam spot 209 sweeps off at least one edge of the glass ribbon as shown in FIGS. 2-3 and 6-16.

As discussed below, the laser beam can heat the separation path 151 on the glass ribbon. Throughout the drawings, the separation path 151 is schematically shown as a broken line with the understanding that the actual separation path is coincident with the glass ribbon such as the edge portions and/or major surfaces of the glass ribbon. As shown, the separation path 151 can extend along the outer edge portions 211a, 211b and a first major surface 213 of the glass ribbon 103 facing the glass separation apparatus 149 from the first outer edge 153 to the second outer edge 155, although the separation path can extend along the opposite major surface of the glass ribbon or at an intermediate location between the two major surfaces of the glass ribbon. Indeed, as shown, the separation path 151 can extend coincident with the outer surfaces of the outer edge portions 211a, 211b and also extend coincident with the first major surface 213 of the glass ribbon 103. Furthermore, as shown, the first outer edge portion 211a can include the first outer edge 153 and the second outer edge portion 211b can include the second outer edge 155 wherein the separation path 151 can extend across a substantial portion or the entire width "W" of the glass ribbon. Likewise, referring to FIG. 1, the glass sheet 104 can include the first edge 165 and the second edge 167 wherein the separation path 163 can extend across a substantial portion or the entire length "L2" of the glass sheet 104.

Figure 7:
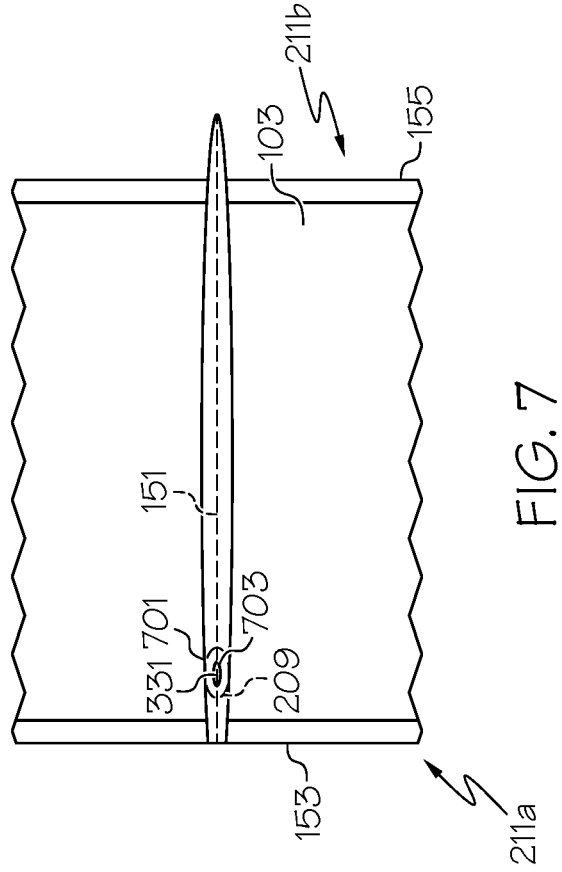
FIG. 7 is a side view of the glass ribbon of FIG. 6 illustrating a varying power density along the separation path of the glass ribbon.

An exemplary method of heating the separation path 151 with the exemplary polygonal reflector 215 will now be discussed. As shown in FIG. 2, for example, as the first reflective surface segment 219a crosses the path of the laser beam, a first edge portion 221a of the first reflective surface segment 219a initially crosses the path of the laser beam 203 to reflect the laser beam, as indicated by laser beam path 228a off a mirror 229. As indicated at 228b (See FIG. 3), the laser beam 203 that has reflected off the mirror 229 is then directed to intersect the separation path 151 at location 331. In one embodiment, as shown in FIG. 7, the laser beam spot 703 at location 331 can have an elongated length that is greater in the direction of the separation path 151 than a direction perpendicular to the separation path. Providing the laser beam spot 703 with an elongated length that extends along the separation path 151 can encourage correct crack formation and propagation along the separation path 151.

In one embodiment, as shown schematically, the mirror 229 can comprise a parabolic or other mirror designed to reflect the laser beam 203 to continue exposing the location 331 to the laser beam spot 703 through a rotational angle of the polygonal reflector 215 in the counterclockwise direction 217 about the first rotation axis 218. Indeed, as shown, in FIG. 2, as the polygonal reflector 215 continues to rotate, the laser beam path 228a scans across the mirror 229 to a new path 232a. As indicated at 232b, the laser beam 203 that has reflected off the mirror 229 (e.g., parabolic mirror) is still directed to intersect the separation path 151 at location 331. In fact, in the illustrated embodiment, the laser beam 203 continues to intersect the separation path 151 at location 331 the entire time the laser beam scans across the mirror from path 228a to path 232a as the polygonal reflector 215 rotates through the rotation angle in the counterclockwise direction 217 about the first rotation axis 218.

In some embodiments, the footprint of the location 331 matches the footprint of the laser beam spot 703 such that the laser beam spot 703 irradiates the entire location 331 during the rotation angle of the polygonal reflector 215. In further embodiments, the location 331 may be larger than the footprint of the laser beam spot 703 wherein the laser beam spot moves a distance through the rotational angle of the polygonal reflector 215. Regardless of the relative size of the laser beam spot 703 and the location 331, the location 331 is heated above and beyond the other portions of the separation path 151 due to the increased residence time of the laser beam spot 703 within the location 331. Furthermore, the location 331 is still heated further as the laser beam spot 209 sweeps across the separation path as discussed below.

Eventually, the polygonal reflector 215 will rotate past the rotational angle such that the laser 203 is not reflected by the parabolic mirror 229. In some embodiments, although not shown, once the polygonal reflector 215 has just rotated sufficiently such that the laser 203 is not reflected by the parabolic mirror, the laser can pass by the mirror and expose the separation path 151 on the outer edge portion 211a of the glass ribbon 103. In further embodiments, as shown by path 301 in FIG. 3, once the polygonal reflector 215 has rotated sufficiently such that the laser 203 is not reflected by the parabolic mirror, the laser can pass between the mirror 229 and the outer edge 153 of the glass ribbon 103 such that the laser does not impact the glass ribbon but travels off the outer edge 153 of the first outer edge portion 211a of the glass ribbon 103. Providing the laser beam to travel off the outer edge 153 can maximize exposure of the separation path 151 and thereby maximize the stress along substantially or the entire separation path 151.

As further shown in FIG. 3, whether or not the laser beam travels off the outer edge 153, rotation of the polygonal reflector 215 eventually causes the reflected laser beam traveling along path 303 to expose an upstream end 222 of a separation path 151 across the glass ribbon 103 to the laser beam spot 209. Indeed, as shown, the upstream end 222 of the separation path 151 is exposed to the laser beam spot 209, thereby heating the separation path 151 at that location. As the polygonal reflector 215 continues to rotate in the counterclockwise direction 217 about the first rotation axis 218, the angle of the first reflective surface segment 219a changes, such that the laser beam spot 209 travels along a direction 225 extending from the first outer edge portion 211a toward a second outer edge portion 211b of the glass ribbon 103. As shown in FIG. 7, the laser beam spot 209 eventually passes over the location 331 previously heated by the reflected laser beam spot 703, thereby further heating the location 331. As shown, in some embodiments, the reflected laser beam spot 703 may have a smaller footprint than the laser beam spot 209 to provide a focused area of enhanced exposure to the laser beam at location 331.

FIG. 4 illustrates the polygonal reflector 215 being rotated such that an intermediate portion 221b of the first reflective surface segment 219a subsequently crosses the path of the laser beam 203 to reflect and expose an intermediate location 401 of the separation path 151 to the laser beam spot 209, thereby heating the path at that location.

Figure 5:
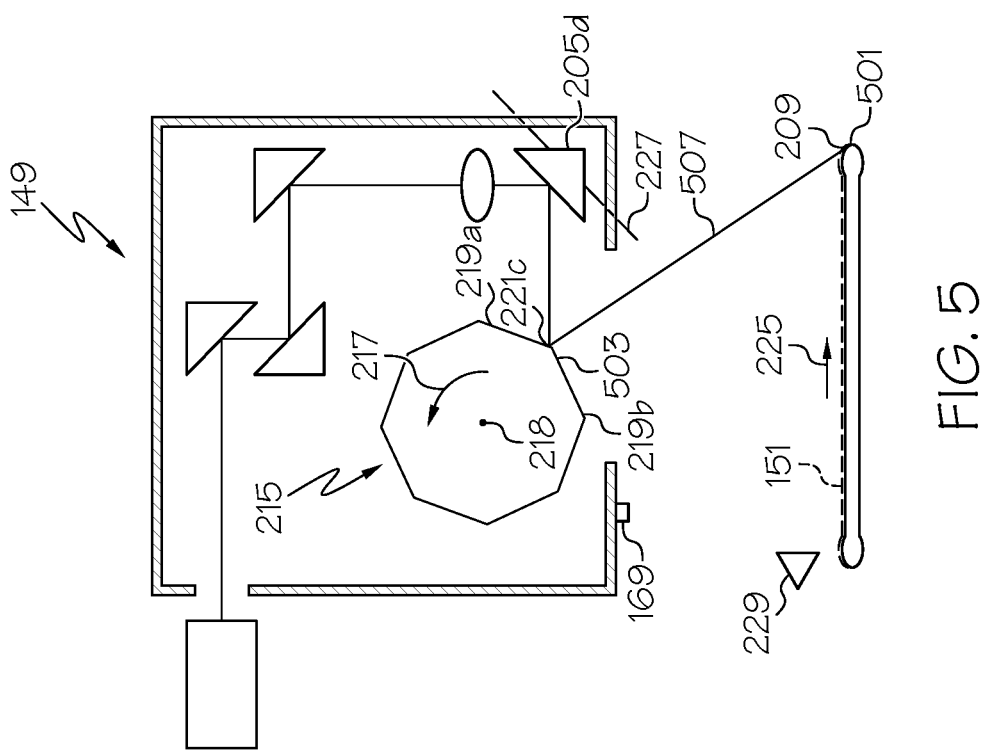
FIG. 5 illustrates the laser beam exposing a downstream end of the separation path on the glass ribbon.

As further shown in FIG. 5, the polygonal reflector 215 can be even further rotated in the counterclockwise direction 217 about the first rotation axis 218 such that a second edge portion 221c of the first reflective surface segment 219a subsequently crosses the path 507 of the laser beam to reflect and expose a downstream end 501 of the separation path 151 to the laser beam spot 209, thereby heating the separation path at that location. A further incremental rotation in the counterclockwise direction 217 about the first rotation axis 218 will cause a first edge portion 503 of the second reflective surface segment 219b to cross the path of the laser beam 203, wherein the laser beam spot 209 will disappear from the downstream end 501 of the separation path 151 and reappear at the location 331 after traveling along path 228a-228b as shown in FIG. 3. Of course, as the actual laser beam comprises a finite diameter, there is a short moment in time where the laser beam will simultaneously reflect from adjacent portions of adjacent reflective surface segments. At such a moment in time, the laser beam spot 209 may partially appear locations associated with the extremes of the sweep path. For example, during a short period of time, the laser beam 203 will reflect simultaneously from the second edge portion 221c of the first reflective surface segment 219a and the first edge portion 503 of the second reflective surface segment 219b. At such moment in time, the laser beam spot 209 may partially appear at the location shown in FIG. 5 and partially appear at the location 331 in FIGS. 2-3.

As such, the step of heating can include repeatedly passing the laser beam spot 209 along the separation path 151 to produce thermal stress along the separation path 151. Moreover, in the illustrated embodiment, the step of repeatedly passing the laser beam spot 209 can optionally include repeatedly passing the laser beam spot 209 in the single direction 225. Indeed, as each of the reflective surface segments 219a-h crosses the path of the laser while the polygonal reflector 215 rotates in the illustrated counter-clockwise direction 217 about the first rotation axis 218, the laser beam spot 209 always moves in the single direction 225 from the upstream end 222 to the downstream end 501 of the separation path 151. The laser beam spot can travel at various speeds along the single direction 225 depending on the rotational speed of the polygonal reflector 215. For example, the laser beam spot can travel along separation path 151 from about 0.5 km/s to about 6 km/s, such as from about 1 km/s to about 5 km/s, such as from about 2 km/s to about 4 km/s such as about 3 km/s.

Further, in addition to repeatedly passing the laser beam spot 209 along the separation path 151 to produce thermal stress along the separation path 151, the location 331 is also heated above the other portions of the separation path as a portion of the laser sweeping off the first outer edge 153 is redirected to expose the location 331 to the laser beam spot 703, thereby further heating that area of the separation path 151.

Although not shown, in further embodiments, the separation path 151 may be heated in a wide variety of ways. For instance, multiple laser beam generators 201 may be provided and/or the laser beam produced by the laser beam generator may be split into two or more laser beams to simultaneously reflect laser beams from different mirrors and/or different portions of the same mirror of the polygonal reflector. As such, multiple laser beam spots may be provided that travel simultaneously along the separation path 151 in the single direction 225 or along opposite directions depending on the optical configuration of the glass separation apparatus 149. In another embodiment, the laser beam 203 produced by the laser beam generator 201 may be extended into an elongated laser beam spot that simultaneously heats the entire separation path 151. In such embodiments, the laser beam spot 209 may remain stationary while simultaneously heating the entire separation path 151 and while a portion of the laser beam directed off the first outer edge 153 is redirected to additionally heat the location 331. In still further examples, a plurality of stationary laser beam spots may be provided to heat the entire separation path 151. For instance, the stationary laser beam spots may be positioned end to end wherein the overall length of all of the laser beam spots extends along the entire length of the separation path 151, or greater than the entire length of the separation path 151 while a portion of the laser beam directed off the outer edge 153 is redirected to additionally heat the location 331. In further embodiments, the stationary laser beam spots may be positioned to partially overlap one another wherein the overall length of all of the laser beam spots also extends along the entire or greater than the entire length of the separation path 151.

Figure 9:
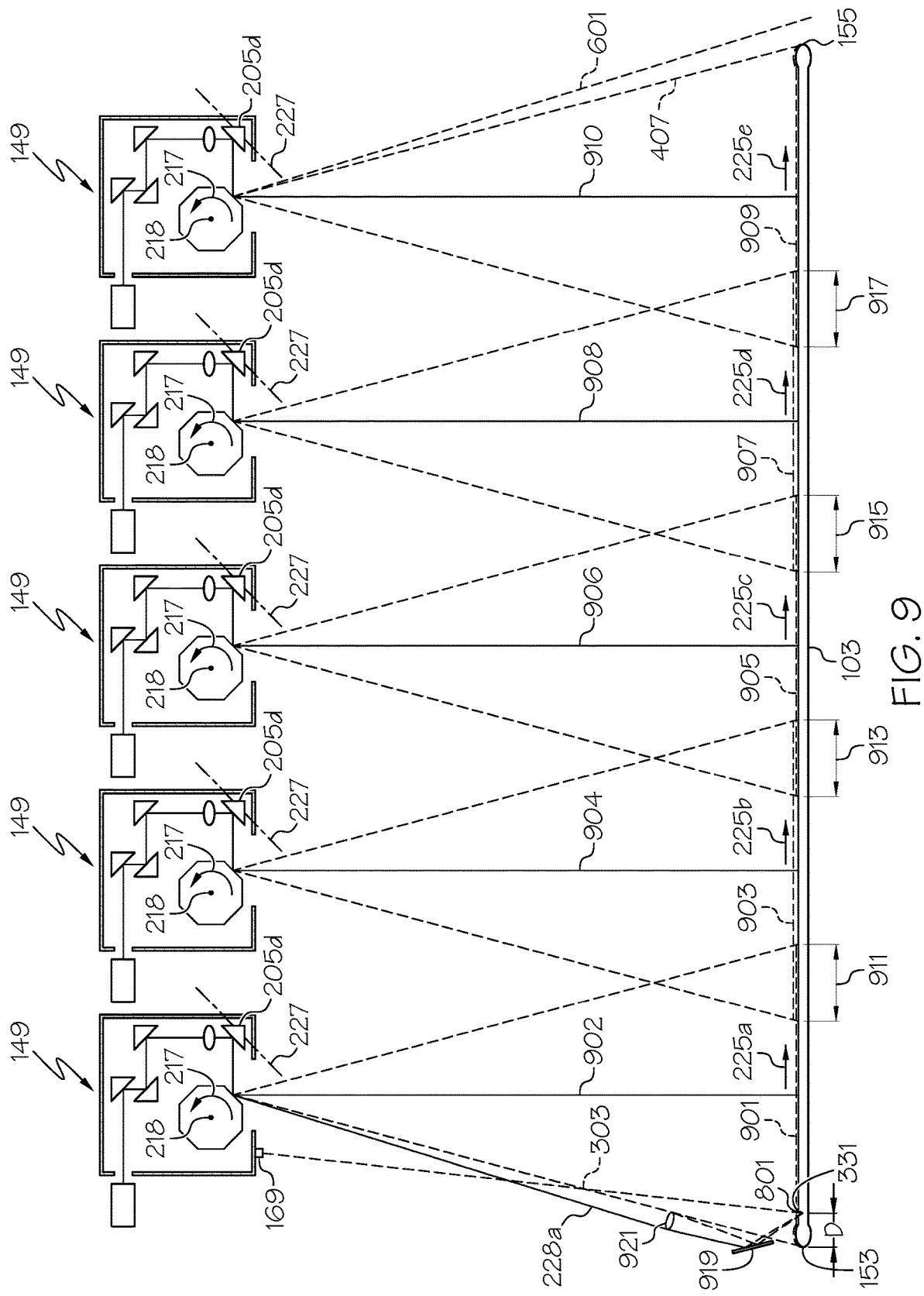
FIG. 9 illustrates another embodiment wherein the separation path is exposed to a plurality of laser beams that each produces thermal stress along a corresponding segment of the separation path.

In still another embodiment, a plurality of the glass separation apparatus 149 may be provided that each exposes a segment of the overall separation path to the laser beam spot 209. For instance, as shown in FIG. 9, a plurality of glass separation apparatus 149 may be provided that may optionally be similar or identical to the previously-described glass separation apparatus 149. It should be noted that while five glass separation apparatus 149 are depicted in FIG. 9, this depiction should not limit the scope of the claims appended herewith as any number of glass separation apparatus (e.g., from 1, 2, 3 to greater than 5 glass separation apparatus) can be used in embodiments of the claimed subject matter. Each glass separation apparatus 149 may produce a laser beam 902, 904, 906, 908, 910 that can produce thermal stress along a corresponding heated segment 901, 903, 905, 907, 909 along the overall separation path with a respective laser beam spot 209 provided by each laser beam. In some embodiments, the heated segments may be positioned end-to-end to heat the separation path along the glass ribbon 103. However, as shown, each heated segment may overlap at least one adjacent heated segment at overlapping regions 911, 913, 915, 917 to provide sufficient heating of the separation path between the segments. In some embodiments, the overlapping regions may include an overlapped length that is from about 5% to about 40% of the length of at least one of the heated segments 901, 903, 905, 907, 909, such as from about 10% to about 30%, such as about 10% to about 25% of the length of at least one of the heated segments. In one embodiment, each corresponding heated segment 901, 903, 905, 907, 909 can have a length of about 800 millimeters (mm) with each overlapping region 911, 913, 915, 917 having an overlapped length of about 100 mm. Providing the segments and optional overlapping regions can help achieve a sufficient level of thermal stress along the overall separation path extending along the glass ribbon.

As further shown in FIG. 9, a portion of the laser beam can be redirected to create the defect 801 with a mirror such as the parabolic mirror 229 discussed above. Alternatively, as shown, an optical arrangement may be provided where a mirror, such as the illustrated flat mirror 919, reflects the laser along and between paths 228a, 303 to focus (e.g., with lens 921) at the location 331 to provide a similar or identical beam spot profile discussed with respect to FIG. 7 above. As shown, the lens 921 may be provided upstream, prior to the laser being reflected by the mirror 919 such that the laser beam begins focusing prior to being reflected by the mirror 919. In alternative embodiments, the lens 921 may be located downstream from the mirror 919 so that the laser beam begins focusing after being reflected by the mirror 919. Although the flat mirror 919 and lens 921 are shown as a method of redirecting the portion of the laser beam in FIG. 9, such a configuration may be provided in any of the embodiments of the disclosure.

Some embodiments of the disclosure demonstrate the laser beam spot traveling across a substantial portion of the glass ribbon, such as the entire dimension of the glass ribbon, and in other embodiments, the laser beam spot is also shown to travel off the glass ribbon. As such, the separation path 151, 163 can likewise extend across a substantial portion of the glass ribbon, such as the entire dimension of the glass ribbon. For instance, as illustrated, the laser beam spot 209 passes along the entire width "W" of the glass ribbon 103 from the first outer edge 153 to the second outer edge 155 such that the separation path 151 extends the entire width "W" of the glass ribbon 103. Likewise, as further illustrated in FIG. 1, the laser beam spot 209 passes along the entire length "L2" of the glass sheet 104 from the first edge 165 to the second edge 167 such that the separation path 163 extends the entire length "L2" of the glass sheet 104. In some embodiments, the separation path 151, 163 can be from about 50 mm to about 5000 mm, such as from about 50 mm to about 1000 mm, although the laser beam spot 209 may travel along longer or shorter paths in further embodiments.

The laser beam spot 209 can comprise a circular spot, although elliptical or other spot shapes may be provided in further embodiments. A minimum diameter of the circular laser beam spot at the focused waist can be from about 1 mm to about 2 mm, when determined as $1/e^2$ of the intensity profile of the spot, although other dimensions may be provided in further embodiments. Likewise, the maximum length of an elliptical or other spot shape can be from about 1 mm to about 3 mm, although other dimensions may be provided in further embodiments. For example, when utilizing a stationary laser beam, the laser beam spot shape can be substantially elongated and have a length of tens of centimeters, for example in excess of 1 meter in length. One or a plurality of stationary laser beam spots may be used to expose the separation path 151.

As described above, as indicated by path 301 in FIG. 3, the laser beam can sweep off at least one end of the separation path such as the upstream end 222 and/or the downstream end 501 of the separation path 151. Indeed, as indicated by path 301 in FIG. 3, the laser beam can sweep off the upstream end 222 of the separation path 151. Furthermore, as indicated by path 601 in FIG. 6, the laser beam can sweep off the downstream end 501 of the separation path 151 in further embodiments. Providing a configuration where the laser beam sweeps off both the upstream end 222 and the downstream end 501 can help maximize exposure of the separation path 151 to heating by the laser beam and ensure that all portions of the separation path 151 achieve a sufficient level of thermal stress. Furthermore, allowing the laser beam to sweep off at least one of the upstream end or the downstream end allows the parabolic mirror 229 or other mirror to redirect the energy of the laser beam traveling off the end of the separation path to be redirected to expose the location 331 of the separation path 151 to further heat this portion of the separation path.

Figure 6:
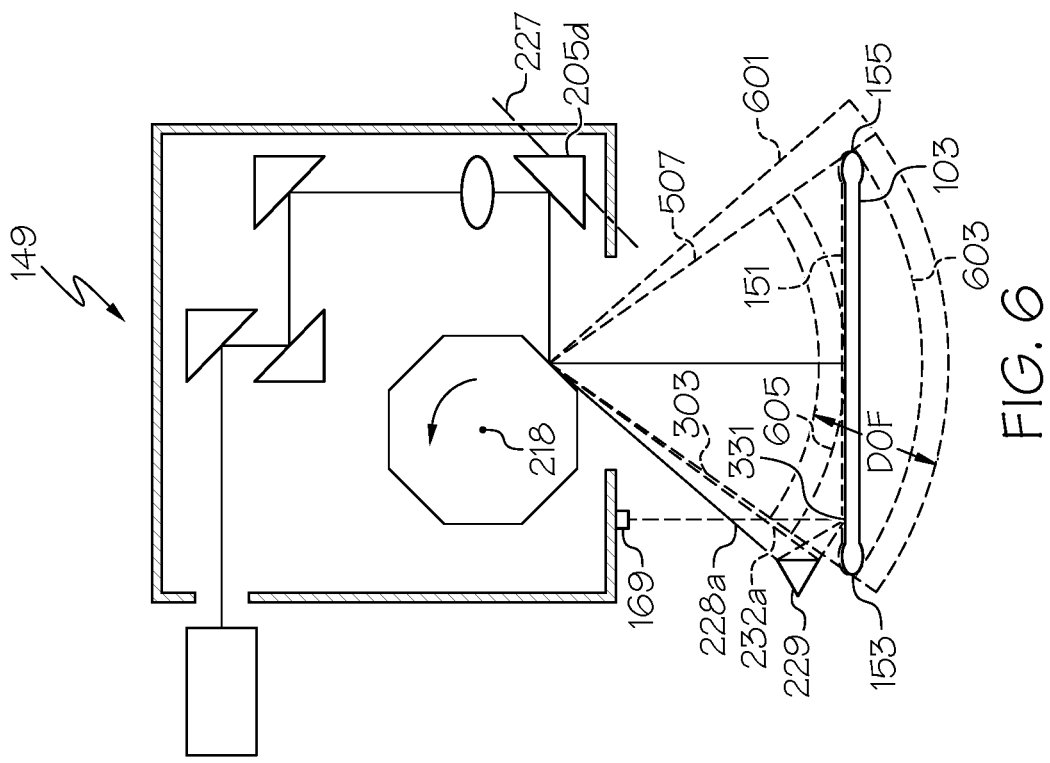
FIG. 6 illustrates the path on the glass ribbon being positioned within the depth of focus of the laser beam.

As further illustrated in FIG. 6, while exposing the separation path 151 along the glass ribbon, the glass ribbon may be positioned such that the entire separation path 151 is located within the depth of focus "DOF" of the laser beam. The depth of focus "DOF" can be calculated by the formula:

$$DOF = \left(\frac{8\lambda}{\pi}\right)\left(\frac{F}{D}\right)^2$$

where "F" is the focal length of the lens 207, "D" is the beam diameter before the lens and "λ" is the wavelength.

Positioning the entire separation path 151 within the depth of focus of the laser beam 203 can help increase efficiency of energy transfer from the laser beam to the separation path 151. Since the depth of focus of the laser beam exceeds amplitudes of the glass warp, thickness variation and motion of the glass ribbon during separation, the depth of focus enables separation of non-flat glass with variable thickness, which can also move or to some extent change orientation relative to the laser beam generator 201. In some embodiments, the depth of focus "DOF" can be from about 20 mm to about 400 mm, such as from about 20 mm to about 200 mm although other depths of focus may be provided in further embodiments.

Furthermore, in some embodiments, the entire glass ribbon, in addition to the path of the glass ribbon, may be positioned within the depth of focus. The depth of focus of the laser beam can be large enough to exceed variations of the glass thickness, glass warp or other possible changes in the position of the glass ribbon, and consequently the separation path on the glass ribbon, relative to the laser beam generator during the methods of the present disclosure.

Furthermore, in some embodiments, a dimension of the laser beam spot 209 on a major surface of the glass ribbon varies while repeatedly passing the laser beam spot along the separation path 151, especially near the ends of the separation path. For example, the dimension of the laser beam spot 209 on the major surface of the glass ribbon may vary along the separation path 151 when the laser beam 203 is focused along sweep path 603 or sweep path 605, although other sweep paths may be provided while the glass ribbon is still maintained within the depth of focus.

As shown in FIG. 7, if traveling along sweep path 605, the laser beam spot 209 may apply a varying power density along the separation path 151, as represented by the illustrated truncated elliptical power density area 701, due to the changes in the diameter and shape of the laser beam spot 209 along the separation path 151. The elliptical power density area 701 of the laser beam spot 209 on the surface of the glass ribbon is truncated since, the laser beam spot intentionally travels off the glass ribbon in the embodiment shown in FIG. 7 with remaining portions of the power density being redirected with the mirror (e.g., parabolic mirror 229) to the location 331 where the other end may include an optional non-truncated elliptical power density area where the laser travels off the second outer edge 153 of the glass ribbon.

When the outer edge portions 211a, 211b comprise thickened edge beads, it may be even more beneficial to separate the glass ribbon using two laser beams 203 that produce maximum power densities located near or at the thickened edges (e.g., edge beads), with portions of the respective laser beam spots overlapping in the central area of the glass ribbon. As the maximum power densities are located closer or at the thickened edges, higher thermal stress may be targeted at the thickened edge beads, resulting in increased thermal stress. At the same time, partially overlapping the relatively lower power density provided by the tail of the laser beam spot can provide enhanced thermal stress due to double exposure from the overlapping laser beam spots. Such overlapping can also be provided at overlapping regions 911, 913, 915, 917 shown in FIG. 9, wherein double exposure can account for the lower power density at the outer ends of the heated segments to help achieve a sufficient level of thermal stress along the overall separation path extending along the glass ribbon.

Localized heating of the separation path 151 creates a temperature differential between different portions of the glass ribbon that creates thermal stress along the separation path 151. The process of heating the separation path 151, as discussed above, can be carried out until a predetermined level of stress is achieved. In some embodiments, the preferred predetermined level of stress is the stress corresponding to the temperature along the separation path 151 that is from about 70% to about 100% of the strain temperature point of the glass, such as from about 80% to about 100%, such as from about 90% to about 100%, such as from about 95% to about 100% of the strain point of the glass. This level of heating avoids generation of residual stress in the glass ribbon. In further embodiments, the predetermined level of stress is the stress corresponding to the temperature along the separation path 151 that is from the strain point up to the annealing point of the glass. While lower temperatures may be possible, sometimes it can be desired to reach relatively higher temperatures to maximize the thermal stress along the separation path 151. Providing a relatively high thermal stress can help reduce the separation time after applying the defect discussed more fully below. In some embodiments, the separation time can be from about 0.1 second to about 3 seconds after creating the defect, although other separation times are possible in further embodiments.

The time necessary to heat the separation path to the desired level of thermal stress can depend on a wide range of factors such as laser power, type of glass, dimension of the glass, its thickness or other factors. In some embodiments, the separation path 151, 163 may be sufficiently heated in a range from about 0.1 seconds to about 5 seconds with a $CO_2$ laser power from about 300 W to about 1.5 kW and a glass thickness from about 0.1 mm to about 3 mm.

As set forth above, the method of separating the glass ribbon (e.g., glass ribbon, glass sheet, etc.) can include the step of exposing a separation path 151 on the glass ribbon to at least one laser beam spot 209 to produce thermal stress along the separation path without damaging the glass ribbon. The method can also include the step of creating a defect on the separation path while the separation path is under thermal stress produced during the step of exposing the separation path on the glass ribbon to at least one laser beam spot 209, whereupon the glass ribbon separates along the separation path in response to creating the defect.

In one embodiment, the defect is produced after a predetermined level of thermal stress is achieved along the separation path 151 during the step of exposing the separation path to the at least one laser beam spot 209. Indeed, as the entire separation path is under a predetermined level of thermal stress, the initiation of the defect directly results in the glass ribbon separating along the separation path in response to creating the defect. The separating can begin as the defect is being created or immediately after the defect is created. As such, separation of the glass ribbon can occur as a direct result of the defect that quickly propagates a full body crack along the entire separation path to separate the glass ribbon based on the predetermined level of thermal stress achieved with the laser beam spot 209 and without assistance of other separation forces such as bending, quenching or otherwise stressing the glass sheet. As used herein, the term full body crack refers to a crack that extends through the entire thickness of the glass ribbon. The time to separate the glass web (e.g., glass ribbon) in accordance with aspects of the disclosure can significantly reduce the time necessary to separate the glass web when compared to conventional techniques. As such, aspects of the disclosure can be beneficial in applications where quick separation of the glass web is desirable over conventional techniques. For instance, in applications with increased draw speed, quick separation can be beneficial to allow separation to occur within a given travel length of the glass ribbon. Furthermore, methods of the disclosure can separate the glass ribbon even at elevated temperature conditions. For example, while separation can occur while the glass ribbon is at room temperature, separation can also occur when the glass ribbon is at an elevated temperature typically below the glass strain point, for example, at a temperature up to 400° C. although other maximum temperatures may be provided in further embodiments. As such, methods of the disclosure can provide separation before the glass ribbon is cooled during the forming process or during other processing procedures.

Figure 8:
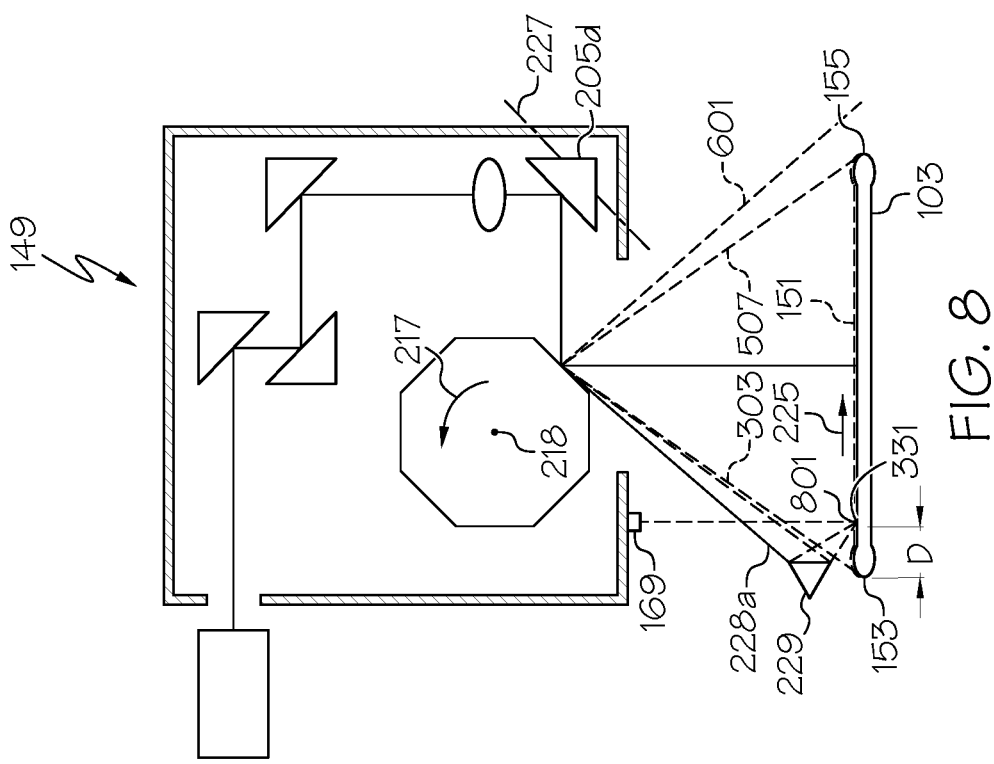
FIG. 8 illustrates the step of creating a defect in the glass ribbon on the separation path.

In one embodiment, as shown in FIG. 8, in any of the embodiments discussed above, the step of creating the defect can be performed while performing the step of exposing the selected separation path to the at least one laser beam spot 209 to produce thermal stress along the separation path. Creating the defect while exposing the separation path can help maintain a sufficient level of thermal stress along the separation path to provide quick separation that occurs in direct response to creating the defect. In some embodiments, the step of exposing the selected separation path may be completed after beginning the step of creating the defect and may even continue until the separation of the glass ribbon along the separation path is complete. Another advantage of creating the defect while exposing the separation path is reduction of probability of uncontrollable breakage, which may start during exposure (heating), when the defect is created prior to exposure. This can enable reliable separation of strengthened glasses, laminated glass structures and any other glass products having high internal stress. Yet, another advantage of creating the defect while exposing the path is reduction of overall time required for separation.

In further embodiments, the step of exposing the selected separation path 151 may be completed just prior to creating the defect, at the time the defect is being created, immediately after the defect is created, or shortly after the defect is created. In such embodiments, the defect can still be created when there is sufficient residual thermal stress along the separation path to provide separation along the separation path. In some embodiments, however, the speed of separation can be increased by continuing to expose the separation path 151 to the at least one laser beam spot 209 while creating the defect and even after creating the defect (e.g., during the entire separation of the glass ribbon). Indeed, continuing to expose the separation path while creating the defect can increase the speed of separation by maintaining a predetermined thermal stress, such as a maximum thermal stress along the separation path. However, overexposure of the separation path should be avoided to minimize or avoid generation of residual stress along the separated edges due to overheating.

The step of creating the defect may be performed in a wide variety of ways. For instance, as shown schematically in FIG. 1, in one embodiment, the defect may be created by mechanically engaging the glass ribbon 103, for example, with a mechanical tool 168 (e.g., score wheel, indenter, rotary tool (rotating disk), diamond tip, etc.). Indeed, a tip of a scribe can create a defect 801 such as a surface imperfection (e.g., surface crack). In further embodiments, the defect may be provided as a point defect or a score line. Although not shown, a support device such as an air bearing or mechanical contact support member may be provided to help counteract the force applied by the scribe to facilitate creation of the defect 801.

In another embodiment, as shown in FIG. 1, the defect may be created with a laser beam generator 169 that is different than the laser beam generator 201 used to heat the separation path 151. As shown in FIG. 1, the laser beam generator 169 may be separate from the glass separation apparatus 149. In further embodiments, the laser beam generator 169 may be mounted to move together with the glass separation apparatus 149. For instance, as shown in FIGS. 2, 4-6, 8 and 9, the laser beam generator 169 may be mounted to a frame, chassis or other structural feature of the glass separation apparatus 149. In some embodiments, movement of the glass separation apparatus 149 can result in a corresponding movement of the laser beam generator 169. In such embodiments, mounting the laser beam generator 169 to move together with the glass separation apparatus 149 can simplify alignment of the laser to irradiate the location 331 at the proper moment in time. Indeed, in embodiments where the glass separation apparatus 149 is following a moving glass ribbon to heat the separation path 151, the laser beam generator 169 can likewise move and always be focused on the location 331 of the separation path 151 without the need for the laser beam generator 169 to adjust its position to track the moving ribbon or time the activation of the laser beam generator 169 at the exact moment in time when the location 331 moving with the ribbon is aligned with the laser beam generator 169. Furthermore, the laser beam generator 169 can be mounted a sufficient distance away from the ribbon 103 (e.g., 1.5 meters or greater from the ribbon) to reduce radiation of heat from the glass ribbon 103 to the laser beam generator 169. As such, enhanced expensive cooling of the laser beam generator 169 due to the heat from the glass ribbon 103 can be avoided.

In one embodiment, the laser beam generator 169 can produce a pulsed laser that can be used to create a defect 801 such as a surface imperfection although sub-surface imperfections may be provided. In some embodiments, the defect 801 produced by the laser beam generator 169 can comprise a crack, a point defect, a score line, or other defect wherein such defect may optionally be created by an ablation process. In some embodiments, the laser beam generator 169 can comprise a lower power $CO_2$ laser in pulse burst mode to create the defect 801 due to thermal stress induced by the $CO_2$ laser pulse burst. In further embodiments, the laser beam generator 169 can comprise a short-pulse diode pumped solid state laser (DPSS laser) that may initiate the defect 801 due to pulsed induced ablation. In any of the embodiments of the disclosure, the defect 801 may comprise an elongated ablation that extends in the direction of the separation path 151 to help properly direct the separation of the glass ribbon along the separation path 151.

In another embodiment, the defect 801 may be initiated by the same laser beam generator 201 used to heat the separation path 151 to create the stress profile along the separation path 151. Indeed, as discussed previously, in some embodiments, a portion of the laser beam produced by the laser beam generator 201 can be redirected to further heat the location 331 to create the defect 801. Using the same laser beam generator 201 can reduce the complexity of the apparatus while still allowing initiation of the defect 801 once a sufficient level of stress is achieved along the separation path 151. Indeed, as the separation path 151 is heated to provide the desired stress profile along the separation path, the location is further heated at a higher temperature wherein the defect 801 (e.g., ablation) is designed to occur once the desired stress profile is achieved along the separation path 151. Thus, once exposure of the location 331 to the laser beam produced by the laser beam generator 201 is sufficient to create the defect 801 in the glass ribbon 103 along the separation path 151, separation of the glass ribbon occurs since the separation path 151 has already been heated by the same laser beam generator 201 to create the desired stress profile along the separation path 151.

In some embodiments, the defect can be located on an outwardly facing side opposite the side of the glass ribbon being exposed to the laser beam spot. In further examples, the defect can be located on the inwardly facing side being exposed to the laser beam spot and may even include defects on both sides of the glass ribbon. Still further, the defect may also be located on the outer edge of the ribbon, on one corner, on both corners (e.g., two defects), or the defect may be a continuous defect extending from the inwardly facing surface to the outwardly facing surface.

In some embodiments, providing the defect as a score line may be beneficial to help direct a proper full body crack along the direction of the separation path 151, 163. For example, the score line can have a length extending along the separation path 151, 163 and a width that is perpendicular to the separation path. The score line can comprise an ablated line in the form of a surface ablation that may form a surface groove or other imperfection in some embodiments. Exemplary score lines can have a wide range of lengths and widths, such as a length within a range from about 0.5 mm to about 5 mm and a width from about 0.1 mm to about 0.3 mm. If provided as a surface defect, the depth of the defect can be from about 5 micrometers to about 500 micrometers, depending on the type of glass. For example, with chemically strengthened glass, a deeper defect may be provided to reach past the chemically strengthened layer of the glass ribbon.

The defect 801 may be provided at any location along the separation path 151, 163 such as on the separation path. In one embodiment, the defect is located near one of the first and second outer edges 153, 155 of the glass ribbon. In one embodiment, it can be beneficial to locate the defect near the first outer edge 153 where scanning of the laser beam spot 209 starts as described below. For instance, as shown in FIG. 8, the defect 801 can be applied between the first outer edge 153 and the second outer edge 155 of the glass ribbon 103, or the defect may be provided at the first edge and/or the second edge in further embodiments. Applying the defect between the first edge and the second edge can be beneficial to help ensure that the crack begins to propagate at the location of the defect rather than at an edge imperfection that may exist at the edge of the glass ribbon. Moreover, applying the defect between the first edge and the second edge of the glass ribbon 103 can also result in faster separation of the glass ribbon. In some embodiments, the defect can be created on a thickened edge bead commonly found at the outer edge portions 211a, 211b of the glass ribbon 103. Alternatively, as shown in FIGS. 8 and 9, the defect may optionally be provided inboard of the thickened edge beads. As shown in FIGS. 8 and 9, in some embodiments, the defect 801 may be created a distance "D" from the first edge (e.g., 153, 165) where in some embodiments, "D" is 0 mm where the defect 801 is created at the outer edge. In some embodiments the defect 801 may be created a distance "D" from 0 mm to about 50 mm, for example from 0 mm to about 35 mm, for example from 0 mm to 25 mm, for example from about 0 mm to about 10 mm. In fact, the defect 801 may be created at any location along the separation path. Furthermore, two or any plurality of defects may be created along the separation path and the separation may occur in a direction from the first edge toward the second edge, from the second edge to the first edge, or separation may occur in both directions toward both the first edge and the second edge. For example, one or a plurality of defects 801 may be provided at a central portion of the separation path, wherein the separation may occur with one or more cracks propagating simultaneously in opposite directions (i.e., toward the first edge and the second edge).

In some embodiments, the defect may be created at a central portion of the separation path or closer to the first edge or the second edge of the glass ribbon 103. In one embodiment, as shown in FIG. 8, the defect 801 may be created closer to the first outer edge 153 than the second outer edge 155. Providing the defect 801 closer to the first outer edge 153 of the glass ribbon (e.g., a distance "D" from the first outer edge 153) can be particularly beneficial when the laser beam spot 209 travels in the single direction 225 from the first outer edge 153 toward the second outer edge 155 of the glass ribbon as discussed above. In such an embodiment, the first outer edge 153 of the glass ribbon 103 is upstream along the travel path of the laser beam spot 209 in the single direction 225. As the full body crack tends to propagate in the single direction 225 of the laser beam spot 209, locating the defect closer to the first outer edge 153 of the glass ribbon can help propagate the full body crack quickly downstream across the width (or length) of the glass ribbon in the direction 225. Furthermore, the defect 801 can be located the distance "D" that is close enough to also allow the full body crack to propagate upstream to intersect with the first outer edge 153.

Furthermore, with reference to FIG. 9, the laser beams 902, 904, 906, 908, 910 can be timed to allow the laser beam spot of each laser beam to travel along the corresponding single direction 225a, 225b, 225c, 225d, 225e in a sequential pattern such that adjacent laser beam spots may coexist along the overlapping regions 911, 913, 915, 917. As such, a laser beam spot may substantially continuously travel along the single direction across the overall width or length of the glass ribbon to help quickly drive the full body crack along the overall separation path.

Any of the methods discussed above may be applied to separate a glass web, such as a glass sheet or a glass ribbon. As such, embodiments discussed with respect to the glass ribbon 103 may also apply to the glass sheet 104 or other glass web. For instance, as illustrated with respect to FIG. 1, the separation path 151 can extend across the width "W" of the glass ribbon 103 between the first outer edge 153 and the second outer edge 155 of the glass ribbon 103. In such embodiments, creating the defect separates a glass sheet 104 from the glass ribbon 103 as shown in FIG. 1. In further embodiments also illustrated in FIG. 1, the separation path 163 can extend along the length "L2" of the glass sheet 104 between the first edge 165 and the second edge 167 of the glass sheet. In such embodiments, creating the defect can separate the edge portion 159 of the glass sheet 104 from the central portion 161 of the glass sheet 104.

Any of the above methods can facilitate separating of a wide range of glass ribbons that may be flat (as shown) or may have a non-flat (e.g., warped) configuration such as bowed into a C-shape, S-shape or other configuration. Furthermore, any of the methods can facilitate separation of glass ribbons with a substantially uniform thickness or a non-uniform variable thickness. For instance, as shown, a glass ribbon with relatively thick edge beads and a relatively thin central portion can be separated.

In another embodiment, the glass ribbon may be separated when the glass ribbon is relatively stationary or when the glass ribbon is in motion. For example, the glass ribbon may be separated while in motion as it is being drawn from a forming member or if the glass ribbon is slightly swinging and/or twisting relative to the forming member. Still further, any of the methods of the disclosure can be used to separate glass ribbon that is at an elevated temperature not exceeding approximately the strain point of the glass ribbon.

Furthermore, methods of the disclosure can be used to separate non-strengthened glass or strengthened glass. For instance, methods can be used to separate a strengthened glass ribbon (e.g., chemically strengthened glass ribbon) including at least one outer layer under compression and another layer in tension. In one particular embodiment, methods of the disclosure can be used to separate strengthened glass ribbon that is strengthened on both sides, wherein the two major surfaces of the glass ribbon are in compression and the central portion of the glass ribbon is in tension.

In further embodiments, methods of the disclosure may be used to separate glass ribbon comprising laminated glass ribbon layers. In one embodiment, the laminated structure can be provided with a compressive surface layer and a central layer under tension. In another embodiment, the laminated structure can be provided with two compressive surface layers with a central layer under tension sandwiched between the two compressive layers. In still further embodiments, methods of the disclosure may be used to separate laminated glass ribbon layers where at least two of a plurality of layers includes different compositions and/or different coefficients of thermal expansion. In other embodiments the glass ribbon may be a chemically or thermally strengthened glass ribbon, wherein the glass ribbon comprises a surface compressive stress layer produced by ion exchange or thermal processing.

In further embodiments, the depth of focus of the laser beam may exceed amplitudes of the glass ribbon thickness variations, amplitude of warp, amplitude of glass motion relative to the beam source or other variations in processing conditions.

FIGS. 10-17 demonstrate exemplary apparatus and methods that may separate the glass ribbon 103 while the glass ribbon moves along a direction of the length of the glass ribbon. Unless otherwise noted, aspects of the disclosure discussed above and with reference to FIGS. 1-9 may apply to the exemplary apparatus and methods of FIGS. 10-17.

FIGS. 10-13 illustrate an exemplary glass separation apparatus 1049 for separating the glass sheet 104 from the glass ribbon 103. FIGS. 14-17 illustrate another exemplary glass separation apparatus 1449 for separating the glass sheet 104 from the glass ribbon 103. The embodiments of FIGS. 10-13 and FIGS. 14-17 can be similar, or identical, to the embodiments shown in FIGS. 1-9 but may be simplified to optionally remove one or more of the reflectors 205a-c. Each glass separation apparatus 1049, 1449 includes at least one laser, such as the laser beam generator 201 that produces the laser beam 203 as discussed more fully above. Each glass separation apparatus 1049, 1449 further includes a first reflector, such as the polygonal reflector 215 discussed above. As mentioned previously, the polygonal reflector 215 can include the previously-discussed first reflective surface. The first reflective surface is rotatable (e.g., in the counterclockwise direction 217) about a first rotation axis 218. As mentioned above, in some embodiments the first reflective surface 219 of the polygonal reflector 215 may comprise a plurality of reflective surface segments similar or identical to the previously-discussed eight reflective surface segments 219a-h. As further shown in the embodiments of FIGS. 10-13 and FIGS. 14-17, the plurality of reflective surface segments may be rotated (e.g., in the counterclockwise direction 217) about the first rotation axis 218 to reflect the laser beam 203 from the reflective surface segments to cause the resultant laser beam spot 209 to repeatedly pass along the separation path 151 on the glass ribbon 103 in a direction transverse to the conveyance direction 1001 such as a direction of the width "W" of the glass ribbon to produce thermal stress along the separation path 151.

As shown in the embodiments depicted in FIGS. 10-13 and FIGS. 14-17, the glass separation apparatus 1049, 1449 for separating the glass sheet 104 from a glass ribbon 103 further includes a second reflector 205d, 1401 including a respective second reflective surface 206, 1402 that may be rotatable about a corresponding second rotation axis 227, 1403 along direction 1003, 1405 to reflect the laser beam 203 to cause the laser beam spot 209 to move in the conveyance direction 1001. In some embodiments, the method includes moving the laser beam spot 209 at a laser beam spot velocity including a laser beam spot velocity vector in the conveyance direction 1001 that is equal to the glass web velocity vector in the conveyance direction 1001. As such, the laser beam spot 209 remains on the same separation path 151 to continuously heat the separation path 151 and consequently continuously increase thermal stress along the separation path 151 even though the glass ribbon 103 is moving in the conveyance direction 1001 (e.g., draw direction). In a down-draw process, the laser beam spot 209 can include a velocity vector in the draw direction 1001 that is equal or substantially equal to the velocity of the glass ribbon in the draw direction 1001. As such, the laser beam spot 209 remains on the same separation path 151 of the glass ribbon 103 to continuously heat the separation path and consequently continuously increase the thermal stress along the separation path 151 even though the glass ribbon is moving in the draw direction of the glass ribbon 103.

As shown in FIGS. 10-13 and FIGS. 14-17, the first rotation axis 218 may be perpendicular to the second rotation axis 227, 1403 although the first axis and second axis may be orientated at another angle relative to one another depending on the optical configuration and/or the desired properties of the laser beam spot 209.

In some embodiments, the first reflector may be positioned upstream or downstream relative to the second reflector. For example, the glass separation apparatus 1049 of FIGS. 10-13 illustrate an embodiment where the second reflector 205d is positioned upstream of the first reflector 215 such that the laser beam 203 reflects off the second reflective surface 206 of the second reflector 205d prior to reflecting off the first reflective surface 219 of the first reflector 215. As demonstrated in FIGS. 2-7, the second reflector 205d that is rotatable about the second rotation axis 227 may be provided in the glass separation apparatus 149 discussed more fully above. In such embodiments, the glass separation apparatus 149 may include the option of rotating the second reflective surface 206 about the second rotation axis 227. In some embodiments, the separation apparatus may allow selection to avoid rotating of the second reflective surface 206. Avoiding rotation of the second reflective surface 206 may be desirable in applications where the glass ribbon is not moving along the length of the glass ribbon.

Alternatively, the glass separation apparatus 1449 of FIGS. 14-17 illustrate an embodiment where the first reflector 215 is positioned upstream of the second reflector 1401 such that the laser beam 203 reflects off the first reflective surface 219 of the first reflector 215 prior to reflecting off the second reflective surface 1402 of the second reflector 1401. In such an embodiment, a configuration demonstrated in FIGS. 2-7 may be used wherein all of the reflectors 205a-d do not include the ability to rotate. As such, the glass separation apparatus may be used in applications where the glass ribbon is not moving along the length of the glass ribbon. Alternatively, the second reflector 1401 may be provided in addition to allow movement of the laser beam spot in the direction of the length of the glass ribbon.

In some embodiments, the at least one laser beam generator 201 may produce a plurality of laser beam spots 209 that each produce thermal stress along a corresponding heated segment of the separation path 151. For example, as shown in FIG. 9, each of the illustrated second reflectors 205d can include a reflective surface that is rotatable about the second rotation axis 227 to allow each of the heated segments 901, 903, 905, 907, 909 to travel along the conveyance direction of the glass ribbon to continuously expose the separation path 151 to the respective laser beam spot of each laser beam.

In some embodiments, the second reflector 205d, 1401 may be provided without the first reflector 215. In such embodiments, the at least one laser beam generator may be designed to produce a single laser beam spot extending along the entire width of the glass ribbon or greater than the entire width of the glass ribbon. Alternatively, the at least one laser beam generator may produce a plurality of stationary laser beam spots (e.g., that may optionally partially overlap one another) that together extend along the entire width of the glass ribbon or greater than the entire width of the glass ribbon. In such embodiments, a single laser beam spot traveling along the separation path is not needed since a stationary single elongated laser beam spot or a plurality of stationary laser beam spots span across the entire width of the separation path. In such embodiments, the second reflector 205d, 1401 may be provided to allow the single laser beam spot or plurality of laser beam spots to move together with the glass ribbon along conveyance direction 1001 (e.g., draw direction) of the glass ribbon to continuously heat the separation path 151 even though the glass ribbon is moving along the conveyance direction 1001.

Methods of separating the glass sheet 104 from the glass ribbon 103 will now be described. The method includes the step of moving the glass ribbon 103 in a direction of the length of the glass ribbon. In some embodiments, the glass ribbon 103 may be moved, such as unwound, from a spool of glass ribbon previously produced wherein the unwound portion of the glass ribbon travels along the length of the glass ribbon. In such an embodiment, the spool of glass ribbon may be unwound wherein the glass sheet may be separated from the glass ribbon without interruption of the process of unwinding the glass ribbon from the spool of glass ribbon. Furthermore, the illustrated embodiment of the glass ribbon 103 is shown being moved in a conveyance direction 1001 (e.g., draw direction) such as in a direction of gravity wherein the draw direction is the same direction as the direction of the length of the glass ribbon and the conveyance direction of the glass ribbon. In alternative embodiments, the glass ribbon may be moved at an angle or even along a direction perpendicular to gravity. Indeed, the glass ribbon 103 may be traveling horizontally along the length of the glass ribbon, for example on air bars, during transport and/or during processing of the glass ribbon. In such embodiments, the glass sheet 104 may be separated from the glass ribbon 103 as the glass ribbon travels in a lateral (e.g., horizontal) conveyance direction.

The method can further include exposing the separation path 151 on the glass ribbon 103 to at least one laser beam spot 209 to produce thermal stress along the separation path 151 without damaging the glass ribbon 103. The separation path 151 is considered the path on the first major surface 213 where separation will occur, for example, by a full body crack forming along the separation path and through the entire thickness of the glass ribbon from the first major surface of the glass ribbon to the second major surface of the glass ribbon in response to the creation of the defect discussed more fully below. The separation path 151 can extend in a direction of the width "W" of the glass ribbon. For example, the separation path may optionally be perpendicular to the length "L1" such that the resultant directional vector of the separation path 151 is identical to the resultant directional vector of the width "W" of the glass ribbon. In such an embodiment, separation may result in the glass ribbon including a separated edge extending along the separation path that is perpendicular to the outer edges 153, 155 of the glass ribbon 103 (i.e., outer edges 153, 155 that are parallel to one another). Alternatively, the separation path may be at an angle other than perpendicular to length "L1" wherein the resultant directional vector of the separation path 151 is not identical to the resulting directional vector of the width "W" of the glass ribbon. In such an embodiment, separation may result in the glass ribbon including a separated edge extending along the separation path that is at an acute angle relative to one of the outer edges 153, 155 (i.e., parallel outer edges 153, 155) and an obtuse angle relative to the other of the parallel outer edges 153, 155.

As shown in the drawings and discussed above, the method can include intersecting the at least one laser beam 203 at a corresponding laser beam spot 209 on a major surface, such as the first major surface 213, of the glass ribbon 103. The method can include repeatedly passing the laser beam spot 209 along the separation path 151 in the direction 225 of the width "W" of the glass ribbon 103 to produce thermal stress along the separation path 151. In some embodiments, the laser beam spot 209 may travel in a single direction (e.g., in the direction 225) in a direction from the first outer edge 153 toward the second outer edge 155 of the glass ribbon 103 without traveling in an opposite direction from the second outer edge 155 to the first outer edge 153 of the glass ribbon 103.

Exemplary methods can include reflecting the at least one laser beam 203 off the first reflective surface 219 of a first reflector 215 rotating about the first rotation axis 218 to cause the laser beam spot 209 to repeatedly pass along the separation path 151 in the direction 225 of the width "W" of the glass ribbon 103. As discussed above, the first reflector 215 may comprise a polygonal reflector that rotates to cause the laser beam spot 209 to travel in the single direction 225.

Methods of the disclosure can further include the step of moving the laser beam in the conveyance direction 1001 (e.g., draw direction, direction of the length "L1" of the glass ribbon 103, etc.) such that the laser beam travels together with the glass ribbon 103. As such, the separation path 151 continues to be exposed to the laser beam to continue producing thermal stress along the separation path 151 while the glass ribbon 103 moves in the conveyance direction 1001.

Such movement of the laser beam in the conveyance direction 1001 can be carried out in any of the above embodiments, where the glass ribbon 103 is heated along the entire width "W" of the glass ribbon 103. For example, such movement of the laser beam can be provided in embodiments where the laser beam generator provides a single stationary laser beam or a plurality of laser beams (and their respective laser beam spots) that are stationary and overlap one another. In further embodiments, such movement of the laser beam in the conveyance direction 1001 can include embodiments that also include repeatedly passing the laser beam spot 209 or a plurality of laser beam spots (see FIG. 9) along the separation path 151. In such embodiments, the method includes the step of moving the laser beam spot in the conveyance direction 1001 such that the laser beam spot 209 travels together with the glass ribbon 103 while the laser beam spot 209 continues to repeatedly pass along the separation path 151 in the direction of the width "W" of the glass ribbon 103 to continue producing the thermal stress along the separation path 151.

As shown in the embodiments of FIGS. 10-13 and FIGS. 14-17, the methods can include reflecting the at least one laser beam 203 off the rotating reflective surface 206, 1402 to cause the laser beam to move in the conveyance direction 1001 (e.g., draw direction) such that the laser beam travels together with the glass ribbon. In such a way, each embodiment of FIGS. 10-13 and FIGS. 14-17 produces thermal stress along the separation path 151 even while the separation path 151 is moving in the direction 1001.

Figure 10:
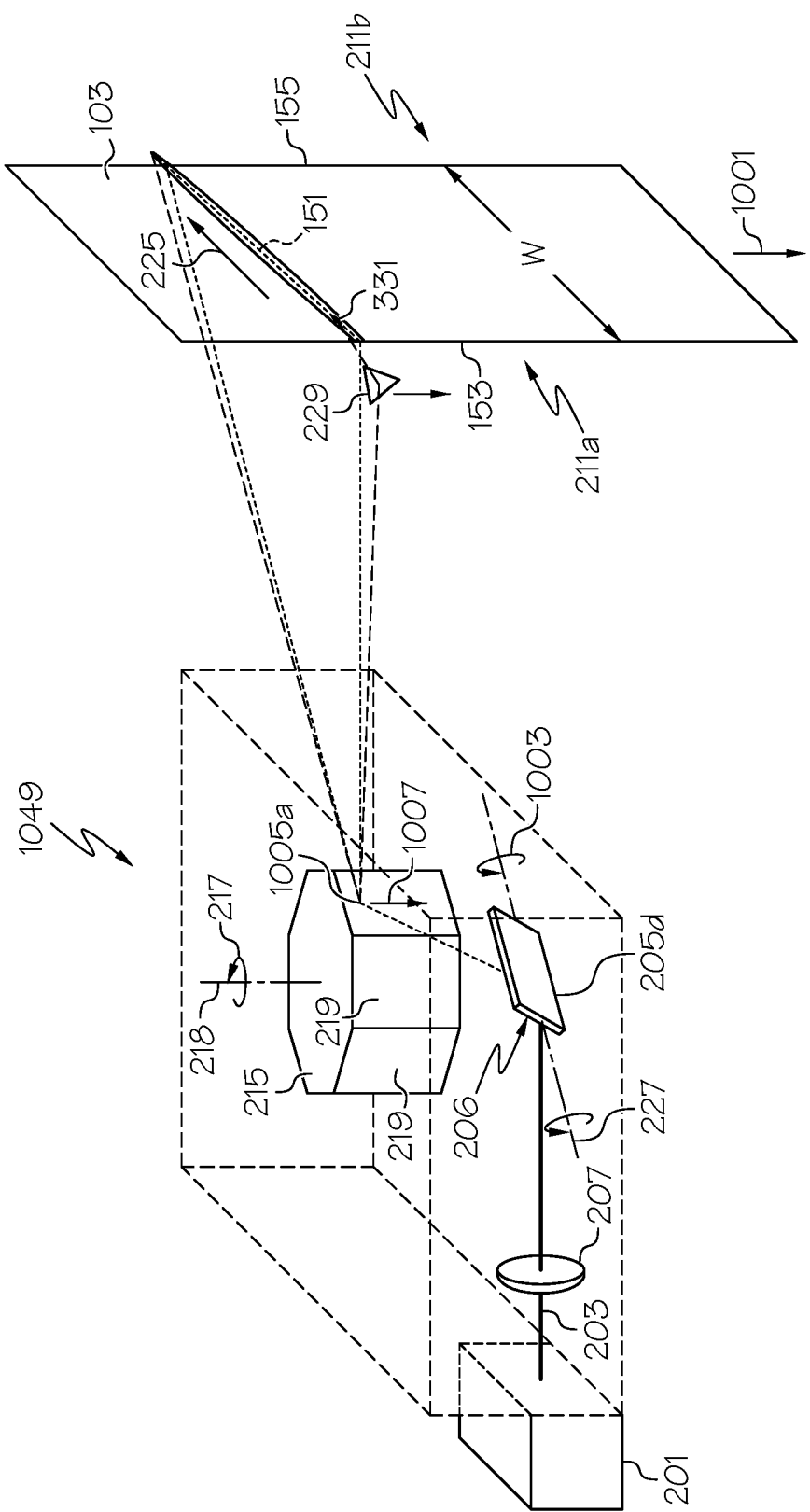
FIG. 10 is a perspective schematic view of an apparatus exposing a separation path on the glass ribbon at an upstream location.

By way of illustration, embodiments of producing thermal stress along the separation path 151 by way of the apparatus illustrated in FIGS. 10-13 will be discussed. Referring initially to FIG. 10, a laser beam 203 produced by the laser beam generator 201 may pass through one or more optical lenses 207 to produce a laser beam spot with a desired shape. The laser beam 203 then reflects off the second reflective surface 206 before the first reflective surface 219 at a first rotational position relative to the second rotation axis 227. While in the first rotational position shown in FIG. 10, the second reflective surface 206 reflects the laser beam 203 to intersect the first reflective surface 219 at a first location 1005a. The laser beam then reflects off the first reflective surface 219 from the first location 1005a to intersect the separation path 151 at a lateral location on the separation path dependent upon the rotational position of the first reflector 215 relative to the first rotation axis 218 as discussed above. Indeed, when using the illustrated polygonal reflector as the first reflector 215, rotation of the polygonal reflector about the first rotation axis 218 in the counterclockwise direction 217 will cause the laser beam spot to travel along the separation path 151 in direction 225 from the first outer edge portion 211a toward a second outer edge portion 211b of the glass ribbon 103. As further discussed above, the step of repeatedly passing the laser beam spot can optionally include repeatedly passing the laser beam spot in a single direction (e.g., the direction 225). Repeatedly passing the laser beam spot in a single direction may help to quickly separate the glass sheet 104 from the glass ribbon 103 upon creating a defect on the separation path as discussed more fully below.

The second reflective surface 206 can be rotated (e.g., continuously rotated) at a rotational rate (e.g., a constant rotational rate) about the second rotation axis 227 such that the location of reflection off of the first reflective surface 219 travels in a direction 1007, such as the illustrated direction, that is parallel to the first rotation axis 218. Moving the location of reflection in the direction 1007 can help the laser beam spot 209 follow the glass ribbon in the conveyance direction 1001 to allow the laser beam spot to continuously intersect with the separation path 151 while the separation path moves in the conveyance direction 1001 and the direction 225 transverse (e.g., perpendicular) to the conveyance direction 1001.

Figure 11:
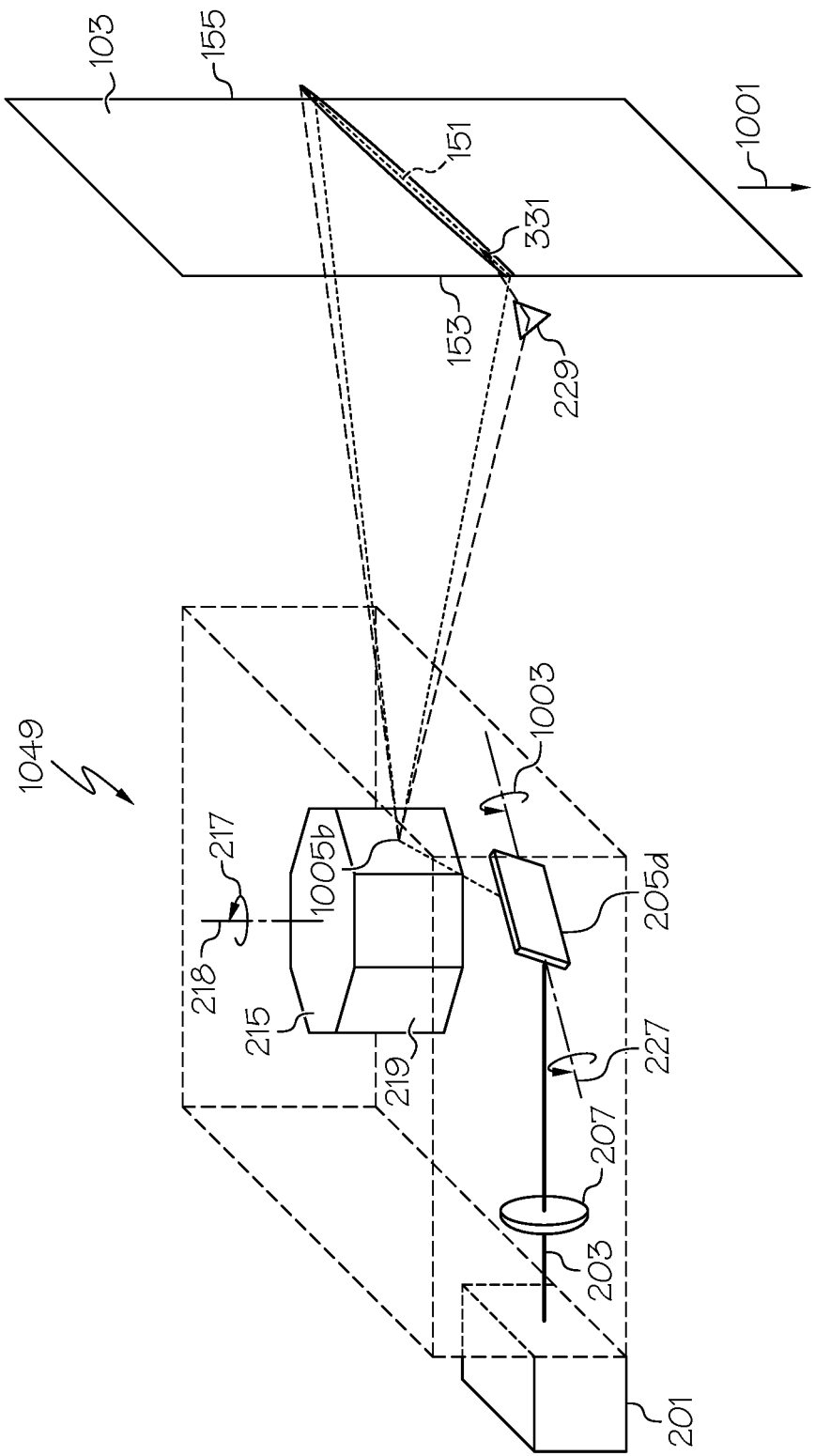
FIG. 11 is the perspective schematic view of the apparatus of FIG. 10 exposing the separation path at an intermediate location.

The second reflective surface 206 can be rotated from the first rotational position (shown in FIG. 10) about the second rotation axis 227 in direction 1003 to a second rotational position (shown in FIG. 11). While in the second rotational position shown in FIG. 11, the second reflective surface 206 reflects the laser beam 203 to intersect the first reflective surface 219 at a second location 1005b downstream from the first location 1005a. The laser beam then reflects off the first reflective surface 219 from the second location 1005b to intersect the laser beam spot 209 with the separation path 151 that has moved downstream in direction 1001 compared to the position of the separation path 151 shown in FIG. 10.

The second reflective surface 206 can be still further rotated from the second rotational position (shown in FIG.

Figure 12:
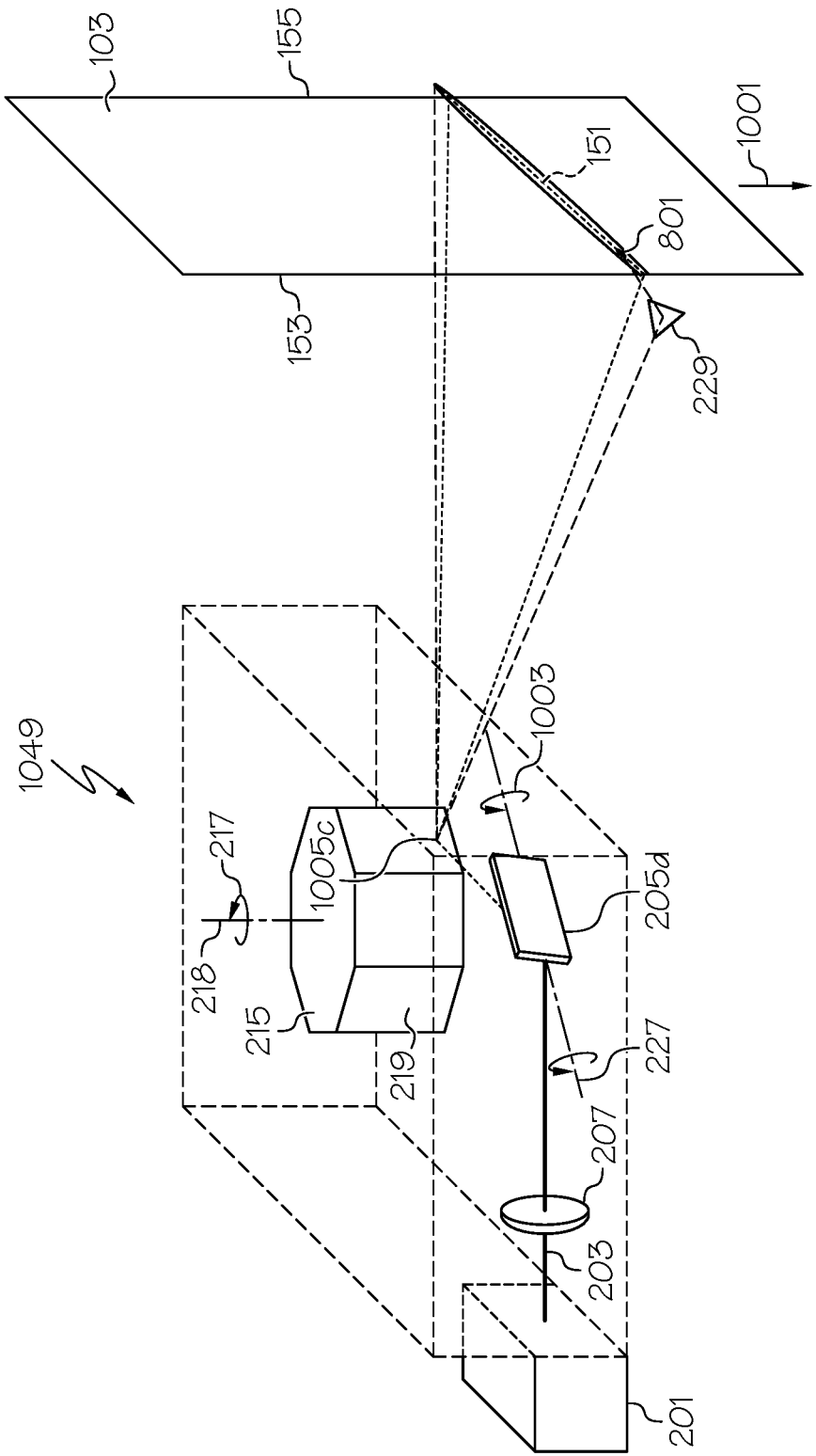
FIG. 12 is the perspective schematic view of the apparatus of FIG. 10 exposing the separation path at a downstream location.

11) about the second rotation axis 227 in direction 1003 to a third rotational position (shown in FIG. 12). While in the third rotational position shown in FIG. 12, the second reflective surface 206 reflects the laser beam 203 to intersect the first reflective surface 219 at a third location 1005c downstream from the second location 1005b. The laser beam then reflects off the first reflective surface 219 from the third location 1005c to intersect the laser beam spot 209 with the separation path 151 that has moved downstream in direction 1001 compared to the position of the separation path 151 shown in FIG. 11.

As can be appreciated, although FIGS. 10-12 show incremental movements of the second reflective surface 206 and incremental positions of the separation path 151, the movement of the second reflective surface 206 can be rotated continuously about the second rotation axis 227 to cause the laser beam spot 209 to continuously intersect with the separation path 151 as the separation path moves in the direction of the length of the glass ribbon.

Figure 14:
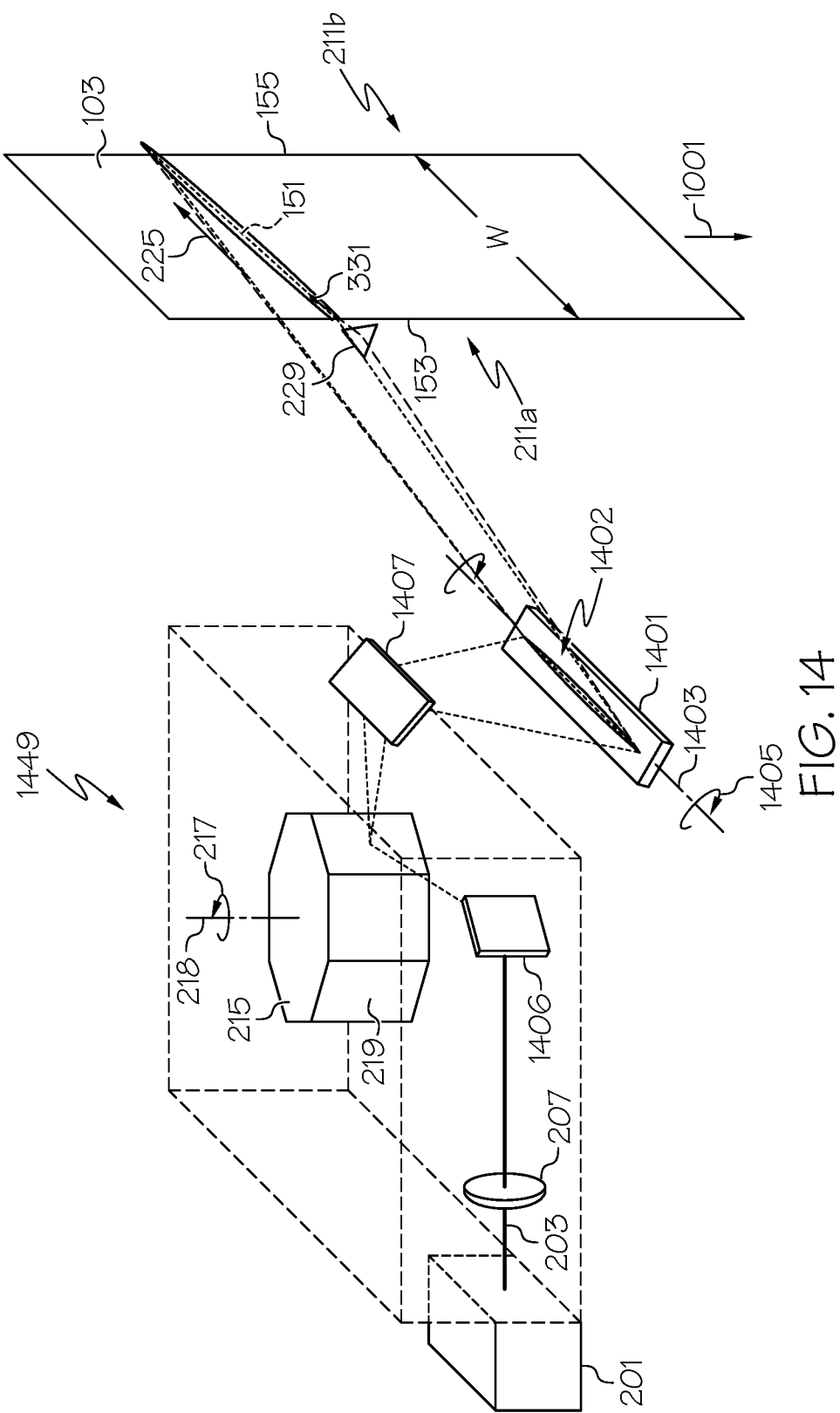
FIG. 14 is a perspective schematic view of another apparatus exposing a separation path on the glass ribbon at an upstream location.

Embodiments of producing thermal stress along the separation path 151 by way of the apparatus illustrated in FIGS. 14-17 will now be discussed. Referring initially to FIG. 14, the laser beam 203 produced by the laser beam generator 201 may pass through one or more optical lenses 207 to produce a laser beam spot with desired shape. The laser beam 203 may then optionally reflect off of one or more stationary reflectors 1406 to intersect the first reflective surface 219 before intersecting the second reflective surface 1402. In one embodiment, the laser beam 203 intersects the first reflective surface 219 at location 1409. The laser beam may then optionally reflect off of one or more additional reflectors 1407 before reflecting off of the second reflective surface 1402 of the second reflector 1401 at a first rotational position relative to the second rotation axis 1403. While in the first rotational position shown in FIG. 14, the second reflective surface 1402 reflects the laser beam 203 to intersect the laser beam spot 209 with the separation path 151 at a lateral location on the separation path dependent upon the rotational position of the first reflector 215 relative to the first rotation axis 218 as discussed above. Indeed, when using the illustrated polygonal reflector as the first reflector 215, rotation of the polygonal reflector about the first rotation axis 218 in the counterclockwise direction 217 will cause the laser beam spot 209 to travel along the separation path 151 in direction 225 from the first outer edge portion 211a toward a second outer edge portion 211b of the glass ribbon 103. As further discussed above, the step of repeatedly passing the laser beam spot can optionally include repeatedly passing the laser beam spot in a single direction (e.g., the direction 225).

The second reflective surface 1402 can be rotated (e.g., continuously rotated) at a rotational rate (e.g., e.g., a constant rotational rate or an adjusted rotational rate) about the second rotation axis 1403 to allow the laser beam spot to continuously intersect with the separation path 151 while the separation path moves in the direction 1001 of the length of the glass ribbon and the direction 225 of the width of the glass ribbon.

Figure 15:
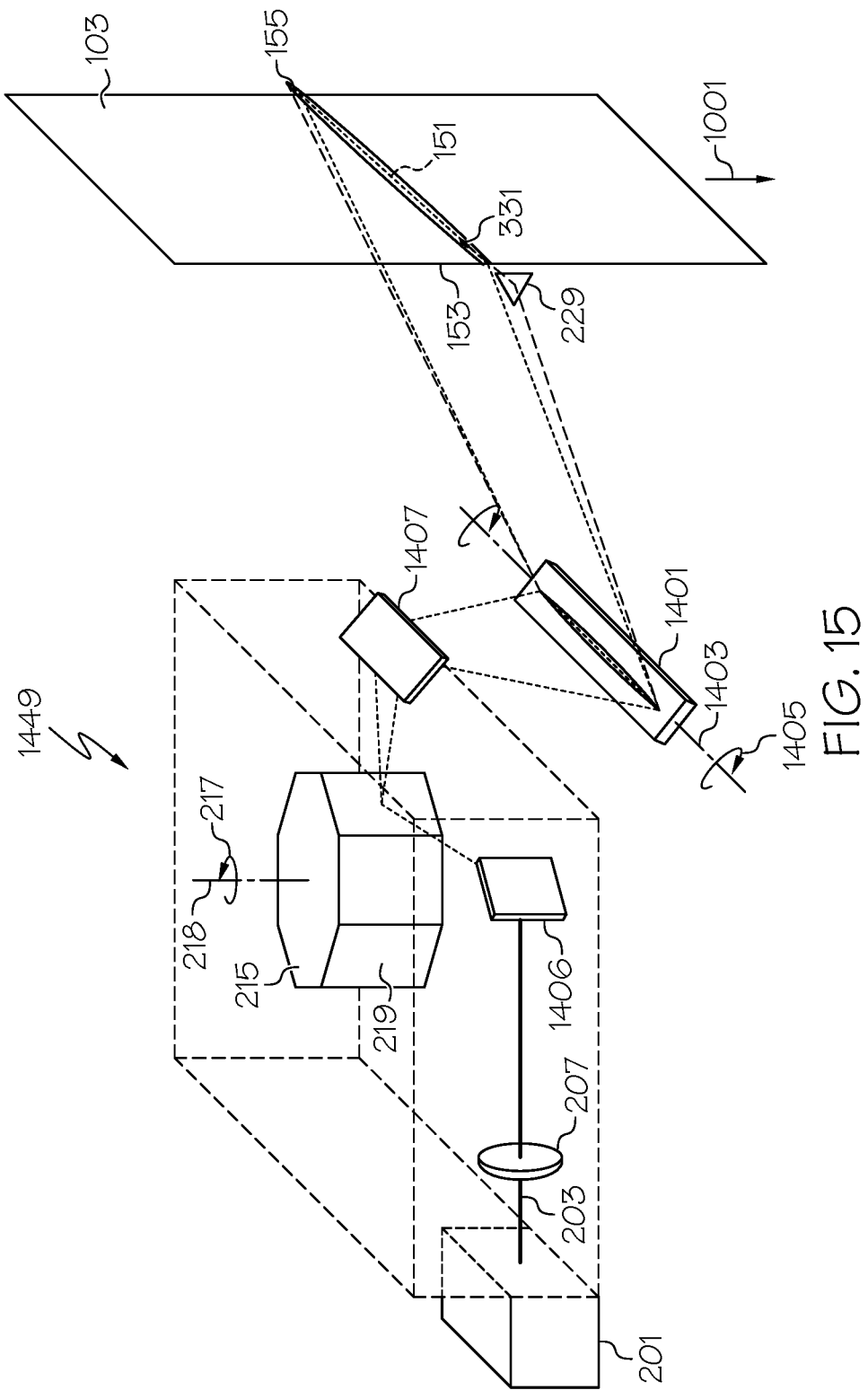
FIG. 15 is the perspective schematic view of the apparatus of FIG. 14 exposing the separation path at an intermediate location.

The second reflective surface 1402 can be rotated from the first rotational position (shown in FIG. 14) about the second rotation axis 1403 in direction 1405 to a second rotational position (shown in FIG. 15). While in the second rotational position shown in FIG. 15, the second reflective surface 1402 reflects the laser beam 203 to intersect the separation path 151 that has moved downstream in direction 1001 compared to the position of the separation path 151 shown in FIG. 14.

Figure 16:
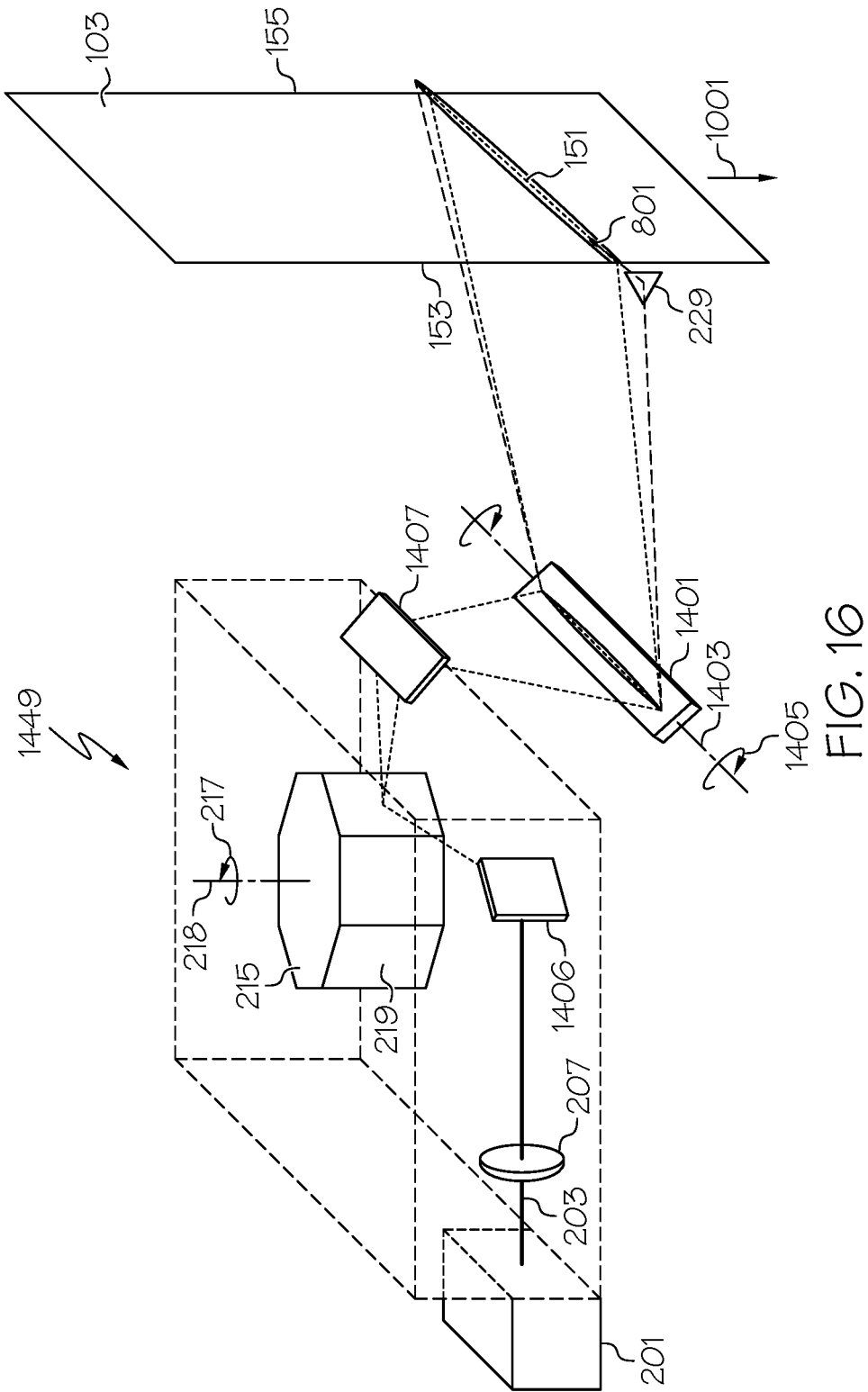
FIG. 16 is the perspective schematic view of the apparatus of FIG. 14 exposing the separation path at a downstream location.

The second reflective surface 1402 can be still further rotated from the second rotational position (shown in FIG. 15) about the second rotation axis 1403 in direction 1405 to a third rotational position (shown in FIG. 16). While in the third rotational position shown in FIG. 16, the second reflective surface 1402 reflects the laser beam 203 to intersect the laser beam spot 209 with the separation path 151 that has moved downstream in direction 1001 compared to the position of the separation path 151 shown in FIG. 15.

As can be appreciated, although FIGS. 14-16 show incremental movements of the second reflective surface 1402 and incremental positions of the separation path 151, the movement of the second reflective surface 1402 can be rotated continuously about the second rotation axis 1403 to cause the laser beam spot to continuously intersect with the separation path 151 as the separation path moves in the direction of the length of the glass ribbon.

In any of the embodiments of the disclosure, rotation of the second reflective surface 206, 1402 can be coordinated with the velocity of the glass ribbon in the conveyance direction 1001 (e.g. in the draw direction) such that the laser beam spot continuously intersects the separation path 151 as the separation path moves along the conveyance direction. For example, the second reflective surface 206, 1402 may be manually rotated about the second rotational axis. In further embodiments, an actuator (not shown) may be used to rotate the second reflective surface 206, 1402 at a continuous predetermined rotational speed to cause the laser beam spot to continuously intersect the separation path 151 as it moves in the direction of the length and as the laser beam spot moves along the direction 225. Still further, the actuator may optionally be operated by a controller configured to obtain feedback from a sensor that senses the velocity of the glass ribbon in the direction of the length of the glass ribbon (e.g., down draw direction 1001) and enters the velocity of the glass ribbon in an algorithm that calculates a target rotational rate of the second reflective surface 206, 1402 about the second rotation axis 227, 1403. The controller can then operate the actuator to rotate the second reflective surface 206, 1402 at the target rotational rate to cause the laser beam spot to continuously contact the separation path 151. In still further embodiments, sensors (e.g., thermal or optical sensors) may be employed to determine where the laser beam spot is intersecting the corresponding major surface of the glass ribbon. The controller may compare this location to the location of the separation path and operate the actuator to speed up, slow down, or maintain the current rotational rate of the second reflective surface 206, 1402 about the second rotation axis 227, 1403 such that the laser beam spot continuously intersects the corresponding major surface of the glass ribbon.

Any of the methods of the disclosure discussed above may further include the step of creating a defect 801 on the separation path 151 while the separation path is under thermal stress produced during the processes discussed above, whereupon the glass sheet 104 separates from the glass ribbon 103 along the separation path 151 in response to creating the defect 801.

The defect 801 may be created by a mechanical scribe (e.g., the scribe 168 discussed with respect to FIG. 1) such as a score wheel, a diamond tip or other defect generating technique. In further embodiments, the defect 801 may be created by a laser beam generator 169 as discussed in any of the embodiments above. If provided, the laser beam generator 169 may travel together with the glass ribbon 103 in the down draw direction 1001 such that the laser beam generator 169 does not need to be adjusted to impact the correct location on the separation path 151 once the defect 801 is desired to be created. In further embodiments, the laser beam generator 169 may remain stationary while the glass ribbon 103 travels in the down draw direction 1001 relative to the stationary laser beam generator 169. In such examples, the laser beam generator may be moved (e.g., rotated) or a reflective surface may be rotated to track the correct location on the separation path 151. Still further, in some embodiments, the stationary laser beam generator may be located such that the laser only impacts a single point when activated. Such a single point can be vertically aligned with the correct location on the separation path 151. As such, the separation path 151 can travel in the down draw direction 1001 until the correct location for creating the defect is coincident with the single point of the stationary laser beam generator. At that moment in time, the stationary laser beam generator can be activated to create the defect 801 at the correct location on the separation path 151.

As shown in FIGS. 10-17, the method can alternatively include the step of creating the defect 801 by redirecting a portion of the laser beam to location 331 to create the defect 801 on the separation path 151 while the separation path 151 is under thermal stress produced during the exposing the separation path 151 on the glass ribbon 103 to the laser beam. In some embodiments, a reflector similar or identical to the reflector discussed above with respect to FIGS. 1-9 may be provided. Indeed, in some embodiments, as shown, the reflector may comprise the illustrated parabolic mirror 229 described with respect to FIGS. 1-8 above. Although not shown, in further embodiments, the mirror 919 and lens 921 discussed with respect to FIG. 9 above may be used to redirect the portion of the laser beam to create the defect 801.

Figure 13:
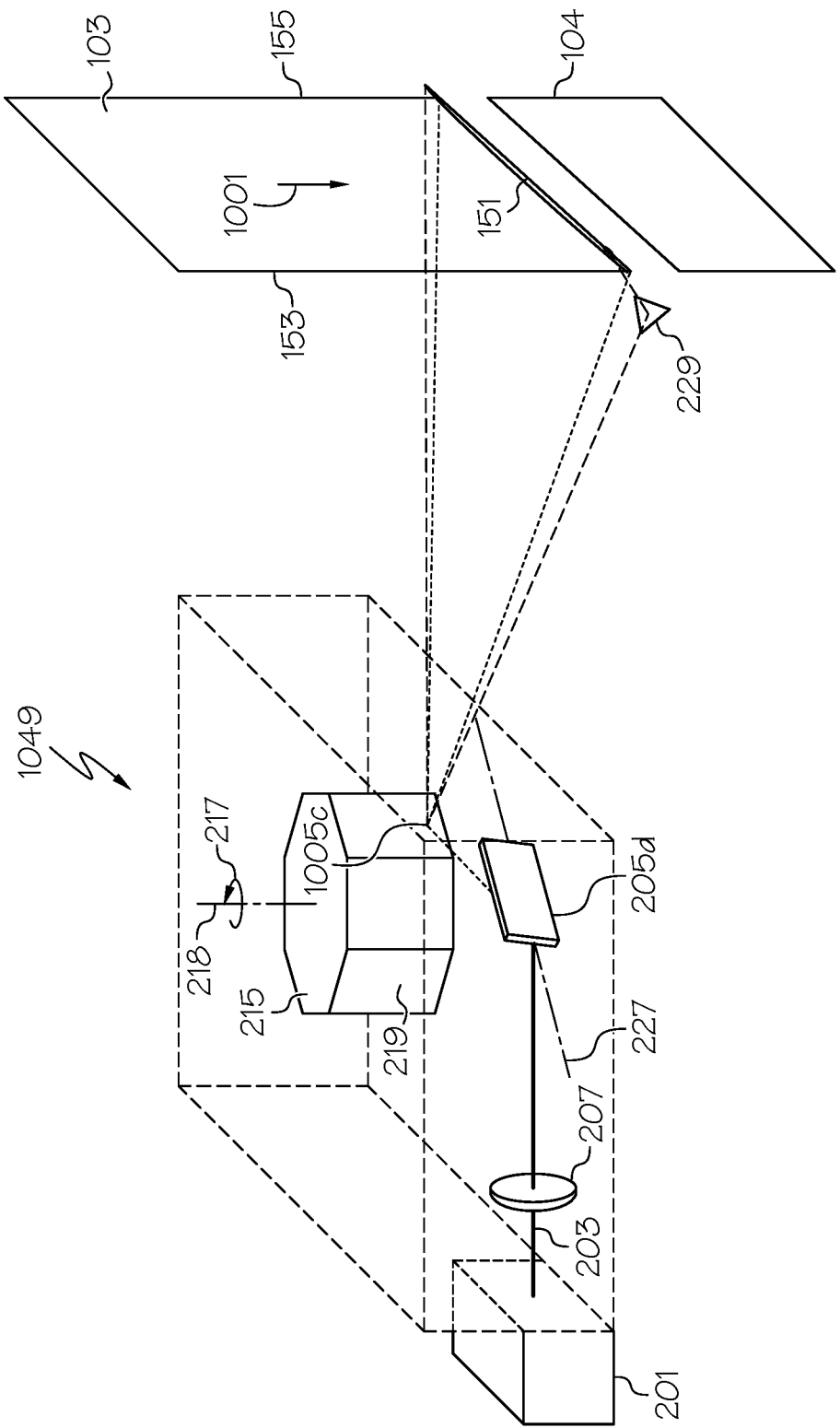
FIG. 13 is the perspective schematic view of the apparatus of FIG. 12 with the glass ribbon separating the glass sheet from the glass ribbon along the separation path in response to a defect being created on the separation path while the separation path is under thermal stress.

In some embodiments, as shown in FIGS. 10-17, the parabolic mirror 229 or other reflector may travel together with the ribbon in the down draw direction 1001 to continuously redirect the portion of the laser beam back onto the location 331 of the separation path 151 as the separation path travels together with the glass ribbon 103 in down draw direction 1001. As shown in FIGS. 13 and 18, in response to the defect 801, the glass sheet 104 separates from the glass ribbon 103 along the separation path 151.

Figure 17:
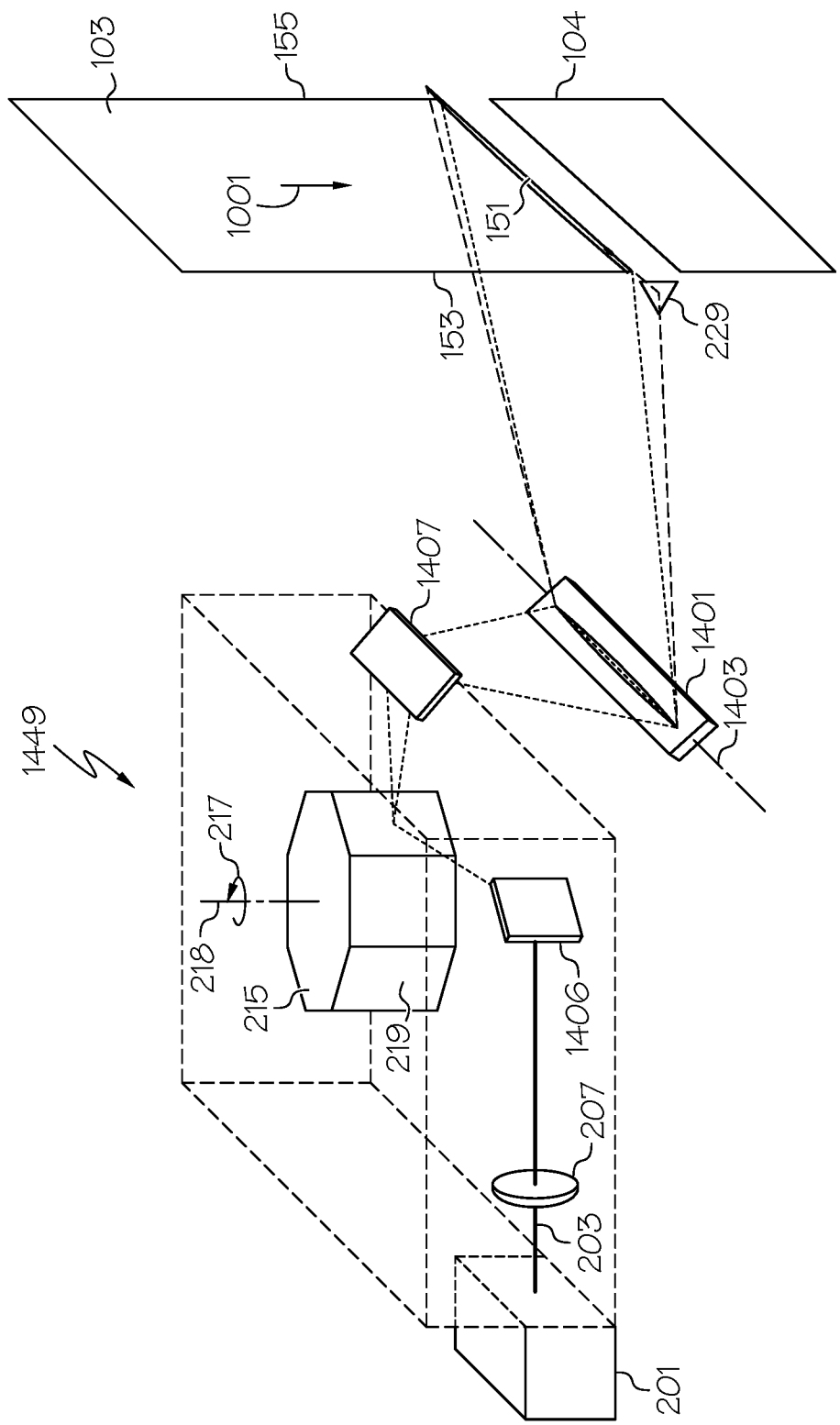
FIG. 17 is the perspective schematic view of the apparatus of FIG. 16 with the glass ribbon separating the glass sheet from the glass ribbon along the separation path in response to a defect being created on the separation path while the separation path is under thermal stress.

As mentioned previously, any of the exemplary methods of the disclosure can include repeatedly passing the laser beam spot 209 in the single direction 225 from the first outer edge portion 211a to the second outer edge portion 211b. Although not required, passing the laser beam spot in the single direction can be beneficial to quickly separate the glass sheet 104 from the glass ribbon 103. For example, as shown in FIGS. 12 and 17, the defect 801 can be created closer to the first outer edge 153 than the second outer edge 155 whereupon the thermal stress profile generated by the laser beam spot 209 traveling in the single direction 225 can help propagate a full body crack in the single direction 225.

In any of the exemplary methods of the disclosure, the defect 801 may be created while the separation path 151 is being exposed to the laser beam 203 to produce the thermal stress along the separation path 151. While the defect 801 may be produced shortly after creating the thermal stress, continuing to generate or maintain the thermal stress with the laser beam along the separation path 151 while generating the defect 801 can allow the defect to be created while the separation path 151 is under maximum stress to facilitate separation of the glass sheet 104.

Furthermore, the defect 801 may be created after a predetermined level of thermal stress is achieved along the separation path during the step of heating the separation path 151. For instance, in some embodiments, the apparatus may be designed such that the defect 801 is generated by redirecting the portion of the laser beam only after a predetermined level of thermal stress is achieved along the separation path 151.

While the embodiments of FIGS. 10-13 and FIGS. 14-17 illustrate a single laser beam, further embodiments can include the use of multiple laser beams to create thermal stress along the separation path. For example, the plurality of laser beams discussed with reference to FIG. 9 may be used in the embodiments of FIGS. 10-13 and FIGS. 14-17 to allow separation of glass ribbons having a relatively larger overall width. In such embodiments, the plurality of laser beam spots can each intersect a corresponding heated segment 901, 903, 905, 907, 909, each laser beam following the separation path 151 as the separation path travels in the direction of the length of the glass ribbon. Furthermore, in some embodiments, each segment of the separation path can overlap a portion of at least one adjacent segment of the separation path (e.g., see overlapping regions 911, 913, 915, 917). Such overlapping regions can allow sufficient thermal stress to be generated along the entire separation path 151.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method of separating a glass web comprising a first edge and a second edge opposed to the first edge, comprising:

exposing a separation path on the glass web from the first edge to the second edge to at least one laser beam to produce thermal stress along the separation path from the first edge to the second edge without damaging the glass web, wherein a portion of a laser beam of the at least one laser beam extends off an edge of the glass web; and redirecting the portion of the laser beam during the exposing to intersect a location of the separation path, wherein the separation path is heated during the exposing from the first edge to the second edge to provide a stress profile along the separation path from the first edge to the second edge while the redirecting the portion of the laser beam further heats the location of the separation path to create a defect at the location of the separation path while the separation path is under thermal stress from the first edge to the second edge produced during the exposing, whereupon the glass web separates along the separation path in response to creating the defect.

2. The method of claim 1, wherein the portion of the laser beam of the at least one laser beam is reflected from a reflecting surface during the redirecting to create the defect.

3. The method of claim 1, wherein the portion of the laser beam of the at least one laser beam is focused to create the defect.

4. The method of claim 1, wherein the defect is created after a predetermined level of thermal stress is achieved along the separation path from the first edge to the second edge during the exposing.

5. The method of claim 1, wherein the defect is created between the first edge and the second edge.

6. The method of claim 1, wherein the defect is created a distance from one of the first edge and the second edge of the glass web, wherein the distance is from 0 mm to about 25 mm.

7. The method of claim 1, wherein the exposing comprises intersecting the at least one laser beam at a corresponding beam spot on a major surface of the glass web, and repeatedly passing the corresponding beam spot along the separation path to produce the thermal stress along the separation path from the first edge to the second edge.

8. The method of claim 7, wherein repeatedly passing the corresponding beam spot includes repeatedly passing the beam spot in a single direction.

9. The method of claim 8, wherein the single direction comprises a direction extending from the first edge toward the second edge of the glass web, and wherein the defect is created closer to the first edge than the second edge.

10. The method of claim 1, wherein the at least one laser beam applies a varying power density along the separation path to produce the thermal stress.

11. The method of claim 1, wherein the at least one laser beam comprises a plurality of laser beams to produce the thermal stress along the separation path, each laser beam of the plurality of laser beams producing thermal stress along a corresponding segment of the separation path.

12. The method of claim 11, wherein each segment of the separation path overlaps at least one adjacent segment of the separation path.

13. The method of claim 1, wherein the glass web comprises a glass sheet, the separation path extends along a length of the glass sheet, and the separation along the separation path separates an edge portion of the glass sheet from a central portion of the glass sheet.

14. The method of claim 1, wherein the glass web comprises a glass ribbon, the separation path extends along a width of the glass ribbon from the first edge to the second edge, and the separation along the separation path separates a glass sheet from the glass ribbon.

15. The method of claim 1, wherein the glass web comprises a plurality of layers and a coefficient of thermal expansion of one layer of the plurality of layers is different than a coefficient of thermal expansion of another layer of the plurality of layers.

16. The method of claim 1, wherein the glass web is positioned such that the entire separation path is located within a depth of focus of the at least one laser beam.

17. The method of claim 16, wherein the depth of focus of the at least one laser beam is from about 20 mm to about 400 mm.

18. A method of separating a glass web comprising a first edge and a second edge opposed to the first edge, comprising:

exposing a separation path on the glass web from the first edge to the second edge to at least one laser beam to produce thermal stress along the separation path from the first edge to the second edge without damaging the glass web, and the exposing comprises repeatedly passing a laser beam spot of the at least one laser beam along the separation path to produce the thermal stress along the separation path from the first edge to the second edge, wherein a portion of a laser beam of the at least one laser beam extends off an edge of the glass web; and redirecting the portion of the laser beam to repeatedly intersect a location of the separation path with the laser beam spot while producing the thermal stress along the separation path from the first edge to the second edge during the exposing, wherein repeatedly intersecting the location of the separation path with the laser beam spot creates a defect at the location of the separation path while the separation path is under thermal stress from the first edge to the second edge during the exposing, whereupon the glass web separates along the separation path in response to creating the defect.

* * * * *